(12) United States Patent
Nussbaum et al.

(10) Patent No.: US 11,494,983 B1
(45) Date of Patent: Nov. 8, 2022

(54) METHOD AND SYSTEM FOR REMOTE VIRTUAL VISUALIZATION OF PHYSICAL LOCATIONS

(71) Applicant: State Farm Mutual Automobile Insurance Company, Bloomington, IL (US)

(72) Inventors: Bryan R. Nussbaum, Bloomington, IL (US); An Ho, Phoenix, AZ (US); Nathan C. Summers, Mesa, AZ (US); Kevin L. Mitchell, Tempe, AZ (US); Rebecca A. Little, Mesa, AZ (US)

(73) Assignee: State Farm Mutual Automobile Insurance Company

( * ) Notice: Subject to any disclaimer, the term of this patent is extended or adjusted under 35 U.S.C. 154(b) by 0 days.

(21) Appl. No.: 17/068,592

(22) Filed: Oct. 12, 2020

Related U.S. Application Data

(63) Continuation of application No. 15/966,902, filed on Apr. 30, 2018, now Pat. No. 10,832,476.

(51) Int. Cl.
*G06T 19/00* (2011.01)
*G06Q 40/08* (2012.01)
(Continued)

(52) U.S. Cl.
CPC .......... *G06T 19/00* (2013.01); *G06F 3/04845* (2013.01); *G06Q 40/08* (2013.01);
(Continued)

(58) Field of Classification Search
CPC .. B64C 39/024; G05D 1/0016; G05D 1/0038; G06F 3/04815; G06F 3/04842; G06F 3/0488; G06F 3/04883
See application file for complete search history.

(56) References Cited

U.S. PATENT DOCUMENTS 7,395,151 B2  7/2008  O'Neill et al.
8,453,219 B2  5/2013  Shuster et al.
(Continued)

OTHER PUBLICATIONS

Non-Final Office Action dated Oct. 2, 2019 for U.S. Appl. No. 15/966,902 "Method and System for Remote Virtual Visualization of Physical Locations" Nussbaum, 35 pages.
(Continued)

*Primary Examiner* — Ming Wu
(74) *Attorney, Agent, or Firm* — Lee & Hayes, P.C.

(57) ABSTRACT

This application discloses methods, systems, and computer-implemented virtualization software applications and computer-implemented graphical user interface tools for remote virtual visualization of structures. Images are captured by an imaging vehicle of a structure and the captured images are transmitted to a remote server via a communication network. Using virtual 3D digital modeling software the server, using the images received from the imaging vehicle, generates a virtual 3D digital model of the structure and stores it in a database. This virtual 3D digital model can be accessed by remote users, using virtualization software applications, and used to view images of the structure. The user is able to manipulate the images and to view them from various perspectives and compare the before-the-damage images with images taken after damage have occurred. Based on all this the user is enabled to remotely communicate with an insurance agent and/or file an insurance claim.

20 Claims, 19 Drawing Sheets

(51) Int. Cl.
  *G06T 17/20* (2006.01)
  *G06F 3/04845* (2022.01)
  *G06V 20/64* (2022.01)

(52) U.S. Cl.
  CPC ............ *G06T 17/20* (2013.01); *G06V 20/653* (2022.01); *G06T 2200/08* (2013.01); *G06T 2219/004* (2013.01); *G06T 2219/024* (2013.01)

(56) References Cited

U.S. PATENT DOCUMENTS

| | | | |
|---|---|---|---|
| 8,756,085 | B1 | 6/2014 | Plummer et al. |
| 9,354,045 | B1 | 5/2016 | Best |
| 9,563,201 | B1* | 2/2017 | Tofte ................. H04N 21/4131 |
| 9,721,304 | B1 | 8/2017 | Parchment et al. |
| 9,881,416 | B2* | 1/2018 | Priest ................. G05D 1/0094 |
| 10,127,722 | B2* | 11/2018 | Shakib ................. G06T 15/205 |
| 10,217,168 | B2 | 2/2019 | Tofte et al. |
| 10,222,301 | B2* | 3/2019 | Da Silva ............ G06K 7/10386 |
| 10,459,706 | B1 | 10/2019 | Little et al. |
| 2004/0193441 | A1 | 9/2004 | Altieri |
| 2009/0138290 | A1 | 5/2009 | Holden |
| 2009/0225001 | A1 | 9/2009 | Biocca et al. |
| 2011/0218825 | A1 | 9/2011 | Hertenstein |
| 2012/0019522 | A1 | 1/2012 | Lawrence et al. |
| 2012/0076437 | A1 | 3/2012 | King |
| 2012/0096384 | A1 | 4/2012 | Albert et al. |
| 2012/0155719 | A1 | 6/2012 | Yun et al. |
| 2014/0055497 | A1 | 2/2014 | Sohn |
| 2014/0119648 | A1 | 5/2014 | Park et al. |
| 2015/0088560 | A1* | 3/2015 | DiRienzo ............... G06Q 40/08 705/4 |
| 2015/0268058 | A1 | 9/2015 | Samarasekera et al. |
| 2016/0061622 | A1 | 3/2016 | Ren et al. |
| 2016/0313736 | A1 | 10/2016 | Schultz et al. |
| 2017/0089710 | A1 | 3/2017 | Slusar |
| 2017/0090460 | A1 | 3/2017 | Andrew et al. |
| 2017/0148102 | A1 | 5/2017 | Franke et al. |
| 2017/0192631 | A1 | 7/2017 | Lee et al. |
| 2017/0251143 | A1 | 8/2017 | Peruch et al. |
| 2017/0278409 | A1 | 9/2017 | Johnson et al. |
| 2017/0359712 | A1 | 12/2017 | Meredith et al. |
| 2018/0003516 | A1 | 1/2018 | Khasis |
| 2018/0004498 | A1 | 1/2018 | Meyer |
| 2018/0040039 | A1 | 2/2018 | Wells et al. |
| 2018/0165616 | A1 | 6/2018 | Sun et al. |
| 2019/0014319 | A1 | 1/2019 | Jannard et al. |
| 2019/0095877 | A1 | 3/2019 | Li |
| 2019/0095963 | A1 | 3/2019 | Martin |
| 2019/0102752 | A1 | 4/2019 | Valenti et al. |

OTHER PUBLICATIONS

Final Office Action dated Feb. 5, 2020 for U.S. Appl. No. 15/966,902 "Method and System for Remote Virtual Visualization of Physical Locations" Nussbaum, 41 pages.

* cited by examiner

METHOD AND SYSTEM FOR REMOTE VIRTUAL VISUALIZATION OF PHYSICAL LOCATIONS

CROSS REFERENCE TO RELATED APPLICATION

This application is a continuation of, and claims priority to U.S. patent application Ser. No. 15/966,902, filed on Apr. 30, 2018, and entitled, "METHOD AND SYSTEM FOR REMOTE VIRTUAL VISUALIZATION OF PHYSICAL LOCATIONS," the entire contents of which is incorporated herein by reference.

FIELD OF THE DISCLOSURE

The present disclosure relates to remote virtual visualization of structures and/or locations wherein imaging techniques are used to generate virtual three-dimensional (3D) digital models of the remote structures and/or locations. Representations of the virtual 3D digital models may then be presented to a remote user for the purpose of making damage assessment.

BACKGROUND

After an accident or loss, property owners typically file claims with their insurers. In response to these claims, the insurer assigns an agent to investigate the claims to determine the extent of damage and/or loss and to provide their clients with appropriate compensation. Often, the claim investigations can be time-consuming, difficult and even dangerous for the insurance agents. For example, in order to investigate a claim for damage to a homeowner's roof, an agent may have to climb onto the roof, and perform inspections while on the owner's roof. By climbing on the roof and attempting to maneuver around the roof to perform his inspection, the insurance agent risks serious injury, especially in difficult weather conditions where the roof may be slippery because of rain, snow, and/or ice and winds may be severe.

Even if the insurance agent performs the inspection without injury, performing the full investigation may still be time-consuming. In addition to the time required to drive to and from the incident site and to perform the inspection itself, significant paperwork and calculations may be involved in calculating compensation owed to the clients. All of these steps are time consuming and both delay payment to the client and also prevent the agent from assessing other client claims.

In situations where the insurer has received a large number of claims in a short time period, for example when an area is affected by a hurricane, tornado, or other natural disaster, an insurance agent may not have time to perform timely claim investigations of all the received claims. If claim investigations are not performed quickly, property owners may not receive recovery for their losses for long periods of time. Additionally, long time delays when performing claim investigations can lead to inaccurate investigations results. Moreover, the physical access to damaged sites may be constrained following catastrophic damage to an area.

Insurers have attempted to use remote controlled devices to assist in investigating claims. Current methods involve the insurance agent visiting the site of the damage and using a remote controlled device to investigate a roof of a client. The remote controlled device may employ a camera, video camcorder, etc. to gather data about subject matter related to the claim (e.g., the roof of the client) and may transmit this data to the user, who remains firmly on the ground. However, the insurance agent is still required to visit the site because the remote controlled device, generally, is controlled by a short distance radio controlled handheld console. Furthermore, the operator must have extensive flight training and practice time to successfully and safely operate the remote controlled device.

SUMMARY

The present application discloses methods, systems, and computer-implemented virtualization software applications, and computer-implemented graphical user interface (GUI) tools, for remote virtual visualization of locations and structures. What is disclosed herein relates to remote virtual visualization of structures and/or locations wherein imaging techniques are used to generate virtual 3D digital models of the remote structures and/or locations. The virtual 3D digital models may then be used to generate representations of the virtual 3D digital models that can be viewed and manipulated by a remote user for the purpose of damage assessment and/or filing insurance claims.

In this application an imaging vehicle may be used to capture multiple images of a structure, a plurality of structures, or a location. The imaging vehicle may be an aerial imaging drone that may be autonomous, semi-autonomous, or controlled by either a remote or an on-site controller or pilot. This imaging vehicle may travel around and/or above the structure of interest to capture a plurality of images at various heights and at various angles. The motion characteristics and/or the image capturing characteristics of the imaging vehicle, or the imaging process as a whole, may be determined or set by a user or preselected from a menu of previously determined routines and functions. In further embodiments, other types of aerial or terrestrial imaging vehicles may be used to capture data regarding structures or locations.

For example, the resolution of the captured images can be set at a desired setting. The number of the images captured and/or the angle at which the images are captured may also be set to a desired setting, as may the altitude from which the images are captured. The inspection travel path of the imaging vehicle may also be predetermined or set according to set or predetermined criteria. In one embodiment, an aerial imaging vehicle may hover above a structure at a specific altitude and traverse over the structure along a predetermined grid pattern to capture images at specific intervals with the imaging apparatus of the imaging vehicle pointing towards the structure at a specific angle or alternatively at varying angles. The overlap percentage of each image with the next image may also be set to a desired value.

In this fashion, as described above, the imaging vehicle may capture a plurality of images of the specific structure or location of interest. These images, along with the pertinent data associated with each image, may then be transmitted through a communication network to a remote server and stored at the data storage unit associated with the remote server. The server, using virtualization software and virtual 3D digital modeling algorithms and software, may use these non-virtual 2D digital images that have been received from the imaging vehicle, to construct a virtual 3D digital model of the structure and/or location (and possibly the surrounding areas as well).

This virtual 3D digital model of the structure and/or location may be used to generate and to display representations of the virtual 3D digital models which can be viewed from various angles and from different perspectives by a user through the use of a display apparatus, which may be a variety of flat panel display modules. Alternatively, a virtual 3D digital imaging device may be used to display and view the representations of the virtual 3D digital models of the structure and/or location in a virtual 3D digital environment.

Once a virtual 3D digital model of the structure and/or location has been generated, it may be used to generate representations of the virtual 3D digital models of the structure and/or location. These representations of the virtual 3D digital models may be accessed by various remote users. The viewing and the manipulation of the representations of the virtual 3D digital models of the structure by a user may be done using virtualization software applications or related GUI tools. The necessary software tools may be packaged into one single comprehensive software package, for example a virtualization software application, and may or may not include GUI tools. With this virtualization software application a user is enabled to access the virtual 3D digital model of the structure remotely from any location that has access to a suitable communication network.

The remote user may access the representations of the virtual 3D digital models of the structure and/or location and view the representations of the virtual 3D digital models from different angles and perspectives in order to assess the extent of the damage to property. The remote user may be an insurance agent, or a third party, and may view the same images remotely and communicate remotely with the server and/or the other users. Both a first user and a second user may compare representations of the virtual 3D digital models of the structure and/or location that were captured before and after the damage, and they may compare the before and after images with each other.

In this fashion a user, or multiple users, may remotely inspect and visualize a remotely located damaged structure or location, assess the nature and the extent of the damages, and prepare insurance claims rapidly and without the difficult process of physically visiting the damaged structure.

According to one aspect the server may identify, generate, access, communicate, and/or present data and representations of the virtual 3D digital models to a user. The process may include identifying a physical structure associated with a virtual 3D digital model to present to a user, in addition to generating or accessing a virtual representation of the physical structure. This virtual representation may be communicated to the user. The user may be presented with a visual representation of the physical structure via a GUI. Additionally, the user may be presented visual representations via the GUI in response to user manipulation of the virtual representation. Damage to a component of the physical structure may be identified by comparing the virtual 3D digital model with a previous virtual 3D digital model that was generated before damage occurred. The user may receive a user annotation associated with the virtual representation, and a claim report item may be generated based upon the user annotation.

In some embodiments, the server may receive a request from a user indicating the physical structure of interest, which for example may be a structure that includes a building that is associated with the user. Upon receipt of this request by the server from the user, the server may transmit communication signals to a controller device that is associated with the imaging vehicle. The server may instruct the imaging vehicle to capture a number of new images, which may include new images of the structure.

The server may determine one or more characteristics of the structure based upon the virtual 3D model that may include the virtual 3D model of the structure. The server may identify the physical structure that is based upon the determination made by the one or more characteristics, and the server may transmit communication signals to the user indicating that the visual representation of the physical structure is available for viewing.

The server may generate and/or access a virtual representation of the physical structure. As part of the process of generating and/or accessing the virtual representation, using the virtual 3D model, the server may perform polygon simplification on the virtual 3D model until the virtual representation of the physical structure is below a data size limit for transmission.

The server may communicate the virtual representation to the user. The visual representation of the physical structure may be presented to the user via a GUI, and this GUI may be configured to enable the user to manipulate the virtual representation by performing such changes to the perspective view as rotating the virtual representation, zooming in, zooming out, or changing the viewing angle.

The server may present additional visual representations to the user via the GUI in response to user manipulation of the virtual representation. The GUI may be configured to receive an annotation associated with a location within the virtual representation from the user. The annotation may indicate a condition of a component of the physical structure. The server, may receive an indication of the annotation and/or the location within the virtual representation from the user computing device. In addition, the server may store the annotation and an indication of the location within the virtual representation associated with the annotation in the memory of the server.

The server may identify damage to a component of the physical structure by comparing the 3D model with a previous 3D model. The server may access a previously generated 3D model of the physical structure that was generated prior to any damage, and the server may compare this previous 3D model with the 3D model which was generated based on images that were captured after the damage. In doing the comparison, the server may identify damage to a component of the physical structure based upon the identified differences between the before-the-damage and after-the-damage 3D models.

The server may cause the visual representation of at least a portion of the physical structure to be displayed to a reviewer and may cause any manipulation of the virtual representation by either the user or the reviewer to automatically synchronize any additional visual representation between both the user computing device and the reviewer computing device.

The server may receive a user annotation associated with the virtual representation and generate a claim report item based upon the user annotation. The server may generate a claim report item associated with the component of the physical structure based upon the stored annotation and indication of the location within the virtual representation, and the server may cause the claim report to be presented to a reviewer via a display associated with a reviewer computing device.

The methods and the systems that are described herein in this application can be applied not only to structures but to locations, regions, and various types of geographical locations as well. Additional or alternative aspects may be included in some embodiments, consistent with the description herein.

DETAILED DESCRIPTION

As technology advances, it is possible to use aerial imaging vehicles that do not necessarily require an on-site controller or pilot to control them. Such an aerial imaging vehicle may be an autonomous inspection and imaging vehicle, or it can be a partially autonomous vehicle that can be controlled remotely from a remote location. Regardless of whether the imaging vehicle is fully autonomous or not, the primary mission of the imaging vehicle is to perform the function of inspecting and capturing images of the property and/or structures before any damages have occurred and/or after damages have occurred. The imaging vehicle may be, by way of example, an aerial drone that is equipped with an imaging apparatus for capturing images and a data transmission apparatus for transmitting the captured images and/or associated data of the captured images to a central processing server through a wireless communication network.

Once the remote server receives the images from the imaging vehicle that is operating in the field to inspect and capture images of a property (e.g., a structure at a location), the server can then generate a virtual 3-dimensional (3D) digital model of all or part of the property. This virtual 3D digital model may be generated by virtual 3D imaging software using the obtained images and data, which were captured by the imaging vehicle operating in the field. The images and data may be transmitted through the communication network to the server. A virtual 3D digital model of the inspected property may be generated using virtual 3D digital imaging software. This virtual 3D digital model may be stored for future reference. Multiple virtual 3D digital models of the same property, for example models generated from images captured before and after damages, may be compared with each other in order to assess the extent and the nature of the damages to the structure.

It is further beneficial that the virtual 3D digital model may be used to generate representations of the virtual 3D digital models that can be viewed and manipulated by a remote user. For example, a homeowner may desire to inspect a property for damage following a catastrophic event (e.g., a hurricane or earthquake), but conditions may prevent or delay on-site inspection. To address this problem, systems and methods described herein may be used to enable a user to view a virtual 3D digital model of the property from a remote location. In some embodiments, the user may further utilize the virtual 3D digital model for the purposes of damage assessment and/or filing of insurance claims.

Figure 1:
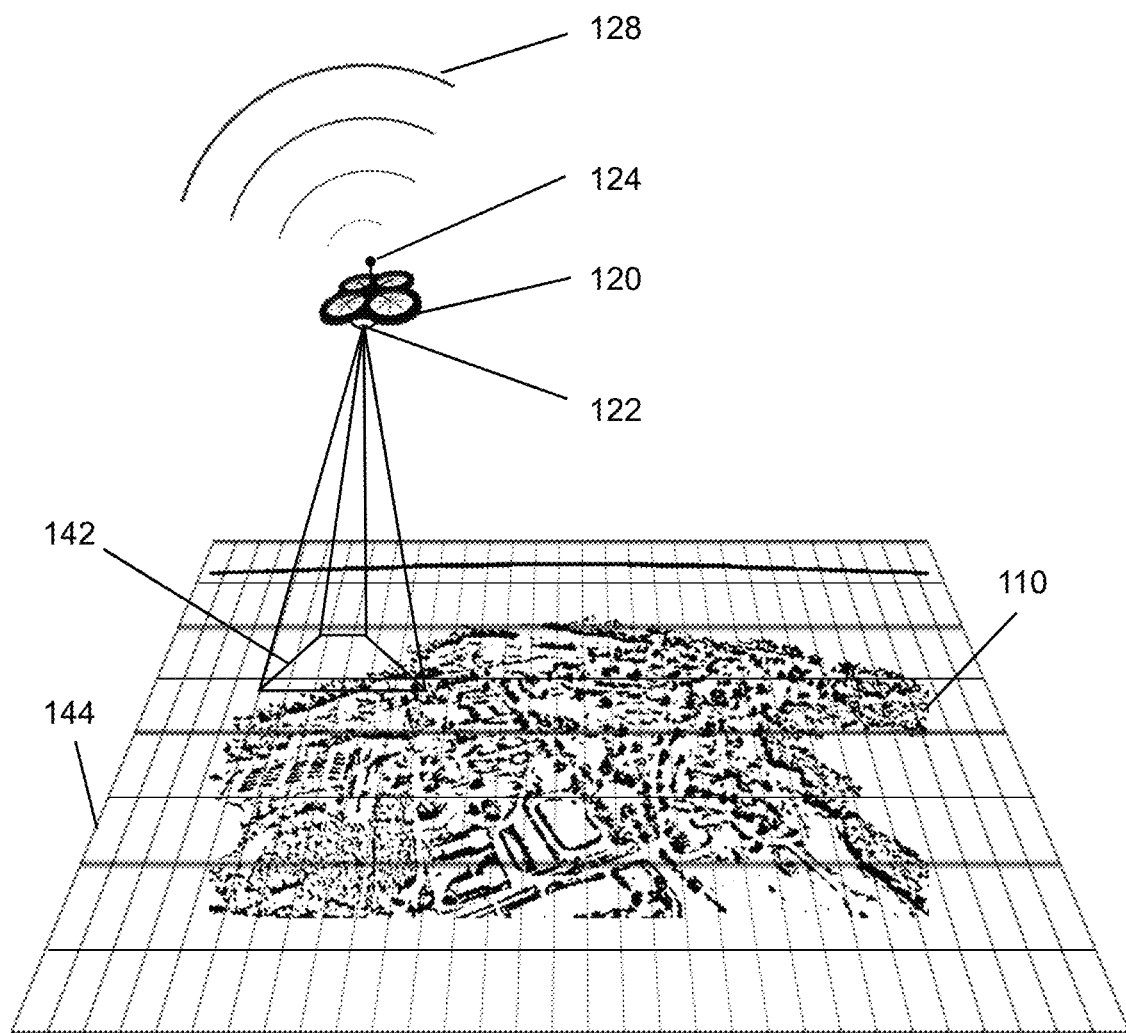
FIG. 1 depicts inspection of an exemplary geographical site that includes multiple structures by an imaging vehicle.

FIG. 1 illustrates inspection and imaging a geographical site 110 using an imaging vehicle 120. The geographical site 110 includes multiple structures. The geographical site 110 may can be inspected by capturing images or other data using one or more imaging vehicles 120. The imaging vehicle 120 may be an aerial drone that is equipped with an imaging apparatus 122 and a communication apparatus 124 for communicating via wireless communication signals 128 the collected images or various other data to a remote server. This imaging may be high-altitude imaging, in which the images generated are of a high-level panoramic nature. Details of individual structures may not be discernible during such imaging. However, images generated in a high-altitude panoramic fashion may help identify relative locations and specific coordinates of individual structures. The imaging vehicle may then be controlled to move closer to the individual structures to capture higher resolution images of each individual structure. The imaging vehicle 110 may be manually piloted or may be an autonomous vehicle that does not require an on-site controller or pilot to control it. The imaging vehicle 110 inspects and performs imaging functions over a field of inspection area 144, and each image that the imaging vehicle 110 captures covers a specific field of imaging area 142. In some application there may be an overlap between field of imaging areas 142 or corresponding images that are captured as the imaging vehicle 110 transverses the field of inspection 144. Although one imaging vehicle 120 is illustrated, any number of imaging vehicles 120 may be used in various embodiments.

Figure 2:
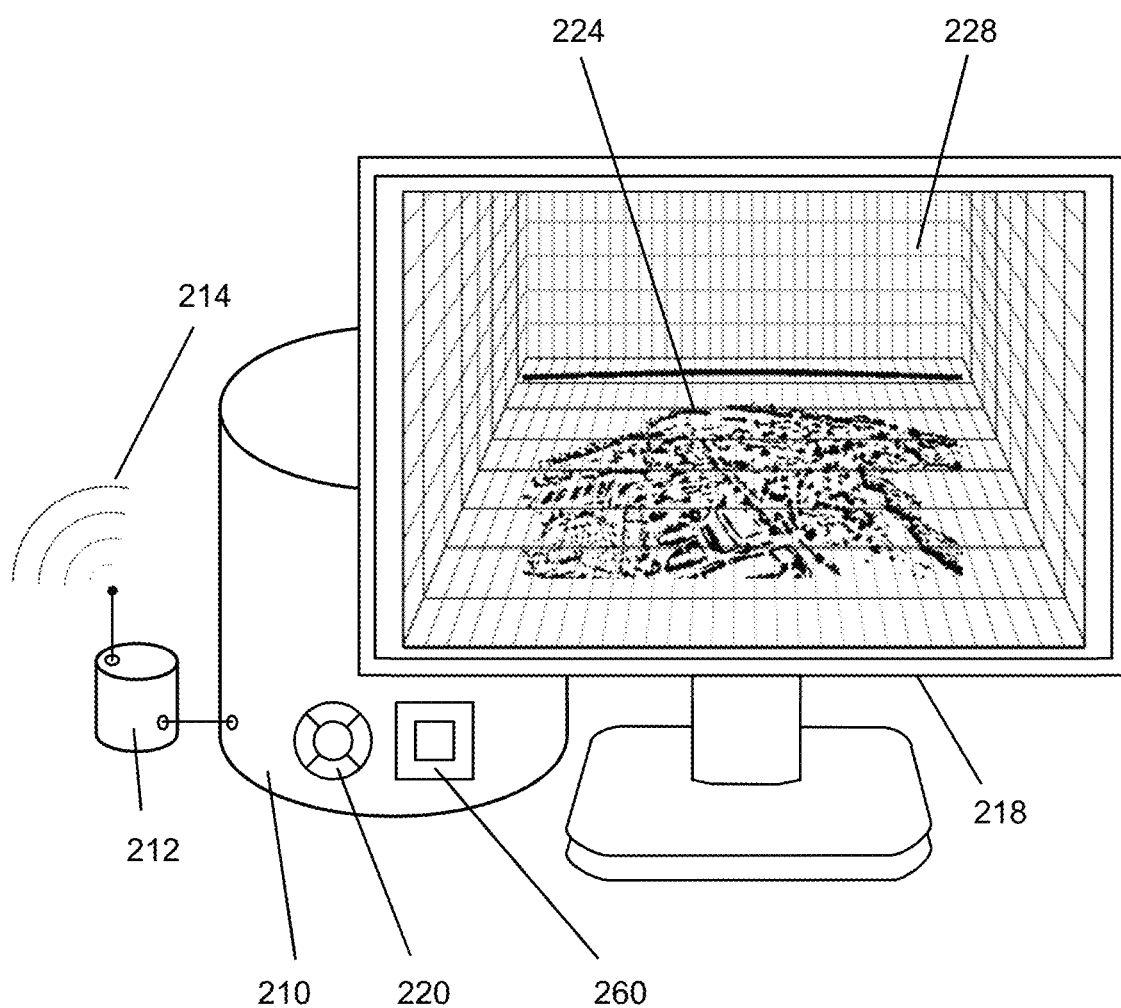
FIG. 2 depicts an exemplary virtual 3D digital model of the geographical site and a representation of the virtual 3D digital model presented via a display.

FIG. 2 depicts an exemplary virtual 3D digital model 220 of the geographical site 110. The virtual 3D digital model 220 may be generated by a virtual 3D digital imaging software 260 using the images and data acquired by the imaging vehicle 120. The images and the data are transmitted through a communication network to the remote server 210 and the data storage unit. The server 210 may be equipped with a remote data link and communication unit 212, through which the sever 210 receives the data transmissions signals 214 which are related to the data that is obtained from the imaging vehicle 120. The server 210 may generate one or more virtual 3D digital models 220 of the inspected geographical site 110. Each virtual 3D digital model 220 may be based on the captured images and may be generated using a virtual 3D imaging software 260 executing on the server 210. From this virtual 3D digital model 220 the server 210 may generate multiple representations of the virtual 3D digital models 224 using the virtual 3D digital imaging software 260. These images may be displayed within a virtual 3D digital imaging environment 228 on a user interface unit 218, such as a flat panel display screen. The representations of the virtual 3D digital models 224 may include 2D digital images to be presented to a user within the virtual 3D digital imaging environment 228 as the user manipulates the views or perspectives displayed.

Figure 3:
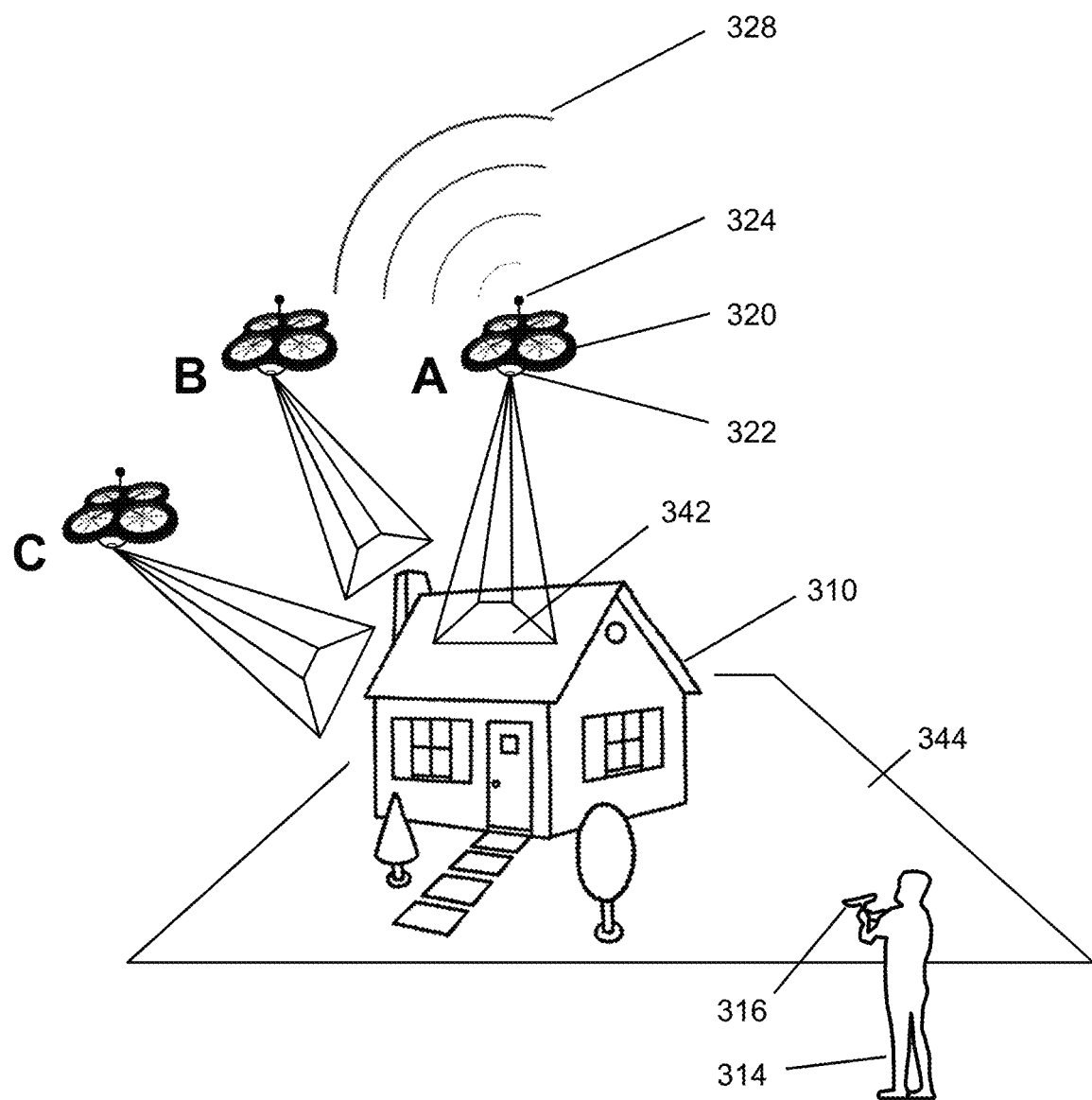
FIG. 3 depicts inspection of an exemplary structure by an imaging vehicle.

FIG. 3 depicts inspection of a property 310 using one or more imaging vehicles 320, which may be the same or different from the imaging vehicle 120. An on-site inspector agent 314, may use an imaging vehicle 320 to perform the function of inspecting and imaging of the property 310, which may be done before any damage has occurred. The inspector agent 314, may use a control unit 316 to control the imaging vehicle 320 at the physical location of the property 310 or remotely through a communication network. The imaging vehicle 320 may be, by way of example, an aerial drone that is equipped with an imaging apparatus 322 for capturing images and a data transmission apparatus 324 for transmitting signals 328 including the recorded images and associated data to a central processing server through a wireless network. The imaging vehicle 320 may be an autonomous vehicle that does not require an on-site controller or a pilot to control it. The field of inspection 344 may be identified as an area within the boundaries of the property 310 which is to be inspected. The field of imaging area 342 is a specific area that is imaged during one image cycle (for example one digital photo image). Each field of imaging area 342 may include data (e.g. an image) regarding a portion of the property 310. In some embodiments, the property 310 may include one or more structures (e.g. a house, a warehouse, an office building, a bridge, a factory, or other structures), in which case each portion of the property 310 may be part or all of one of the one or more structures (e.g. a roof, a garage, or a barn).

Under a first exemplary scenario A, the imaging vehicle 320 is illustrated hovering above a structure above the property 310, while capturing images with the imaging apparatus 322 pointing straight down at a vertical angle with respect to the plane of the field of inspection 344. The imaging vehicle 320 traverses the field of inspection 344 and captures a plurality of images of the property 310, with each image having a field of imaging area 342 associated with that particular image. The field of imaging areas 342 of the various images that are captured may overlap with each other, and the percent of overlap may be set and/or adjusted according to various imaging algorithms and/or settings of the image capturing software routines or image capturing hardware components. Under exemplary scenario A, the imaging vehicle 320 traverses the field of inspection 344 at a particular height and along a path of a predetermined travel grid pattern while capturing images of the property 310 at predetermined intervals with the imaging apparatus 322 pointing straight down.

Alternatively in exemplary scenario B, the imaging vehicle 320 may point its imaging apparatus 322 at a predetermined angle towards a structure of the property 310 and capture images at an angle, such as a 60 degrees angle, with respect to the plane of the field of inspection 344. In this fashion, the imaging apparatus 322 of the imaging vehicle 320 can capture multiple images of the side of the structure as it traverses the field of inspection 344 in a circular or semi-circular path around the structure. In doing so the imaging apparatus 322 captures multiple images of the sides of the structure. In some embodiments, the imaging vehicle 320 may move to an even lower altitude, as in scenario C, such as an altitude that is approximately the same as the height of the structure and adjust the angle of its imaging apparatus 322 so that the imaging apparatus 322 is pointing at the structure at an acute angle (e.g. 30 degrees) with respect to the plane of of the field of inspection 344. The imaging vehicle 322 may then traverse around the structure following a circular, or semi-circular path and in doing so capture a plurality of images of the structure at the exemplary predetermined angle of 30 degrees, or other angles that are indicated by the user and/or controller.

In performing the above described maneuvers above and around the structure on the property 310 the imaging vehicle 320 captures multiple images, possibly hundreds or even thousands of images. From these captured images, a virtual 3D digital imaging software 260 of the remote server 210 may construct or generate a virtual 3D digital model 220 of the structure or a part thereof. Using this virtual 3D digital model 220, the virtual 3D digital imaging software 260, may further generate multiple representations of the virtual 3D digital models 224 that show the structure 310 from various perspectives, various heights, various angles, and various distances as a user interacts with a representation of the virtual 3D digital model 220.

Figure 4:
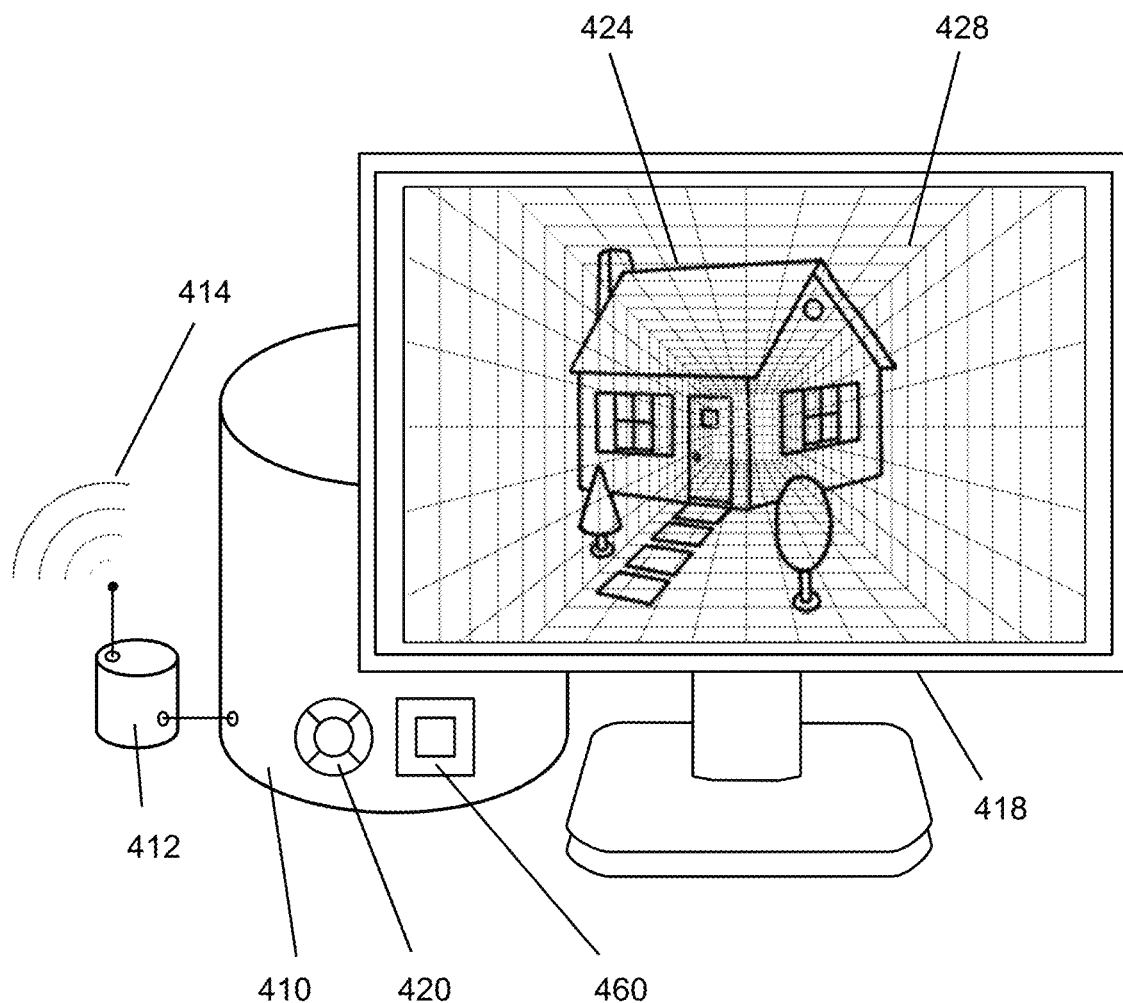
FIG. 4 depicts an exemplary virtual 3D digital model of the exemplary structure.

FIG. 4 illustrates a user interface 418 displaying an exemplary representation of the virtual 3D digital model 424 of the property 310 within a virtual 3D digital environment 428. The representation of the virtual 3D digital model 424 may be generated by a virtual 3D digital imaging software 460 from a virtual 3D digital model 420 of the structure on the property 310. This virtual 3D digital model 420 may be generated by a 3D virtual imaging software 460 using the field-obtained images acquired by the imaging vehicle 320. The images and the data that were captured by the imaging vehicle 320 may be transmitted via signals 414 through a communication network to the server 410, and received by a communication unit 412 that is associated with the server 410. A virtual 3D digital model 420 of the inspected property generated by the sever 410 using the virtual 3D digital imaging software 460 may be stored for future reference in data storage units that are associated with the server 410. Other virtual 3D digital models of the same property 310, for example after damage, can be compared to this virtual 3D digital model 420 to assess damage and/or changes to the property 310, as discussed further herein.

Figure 5:
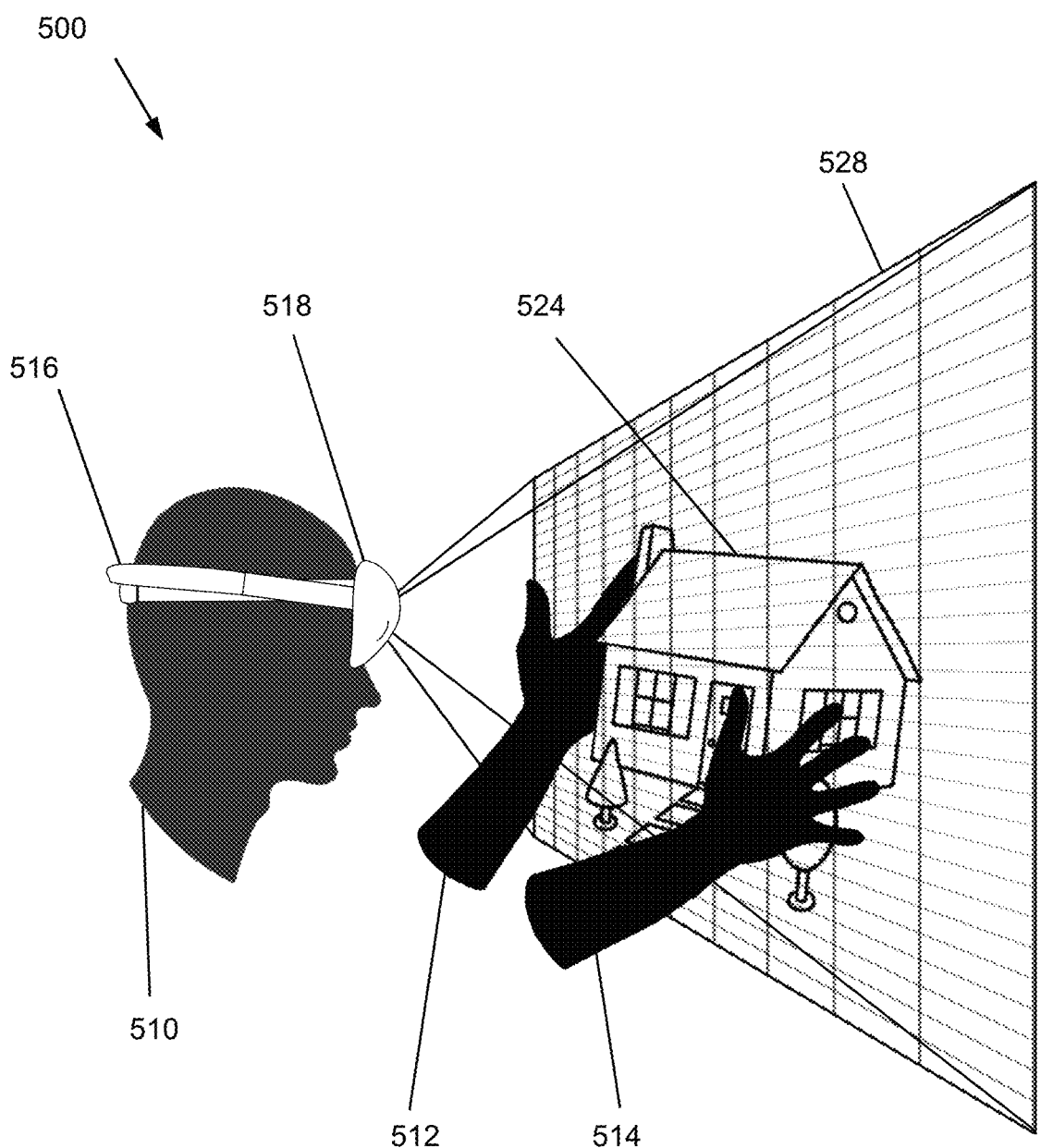
FIG. 5 depicts an exemplary display apparatus configured to present a virtual 3D digital model of the structure to a user in a virtual 3D imaging environment.

FIG. 5 depicts an exemplary display apparatus system 500 configured to present a representation of the virtual 3D digital model 420 to a user 510 using a virtual 3D digital imaging device 518 that presents representations of the virtual 3D digital models 524 of a virtual 3D digital model 420 of the property 310 within a virtual 3D digital environment 528. The virtual 3D digital imaging device 518 may be configured to be placed in front of the user's eyes, like a pair of goggles or spectacles are worn, and held in place by a mechanism such as a head gear mechanism 516. As the user 510 views the representations of the virtual 3D digital models 524 of the property 310 the virtual 3D digital environment 528, the user 510 may use hand gestures, such as using left hand 512 or right hand 514 in order to manipulate the representation of the virtual 3D digital model 524 displayed. The user 510 may thus manipulated a representation of the virtual 3D digital model 420 of the property 310 (or a structure with the property 310) in order to change the perspective, angle, size, zoom factor, resolution, or other image characteristics of the representation of the virtual 3D digital model 524 displayed via the virtual 3D digital imaging device 518. For example, the user 510 can use hand gestures in order to rotate the virtual representation of the structure in order to view the structure from another perspective. Alternatively, in some embodiments, the user may use a control device in addition to, or in place of, hand gestures.

Figure 6:
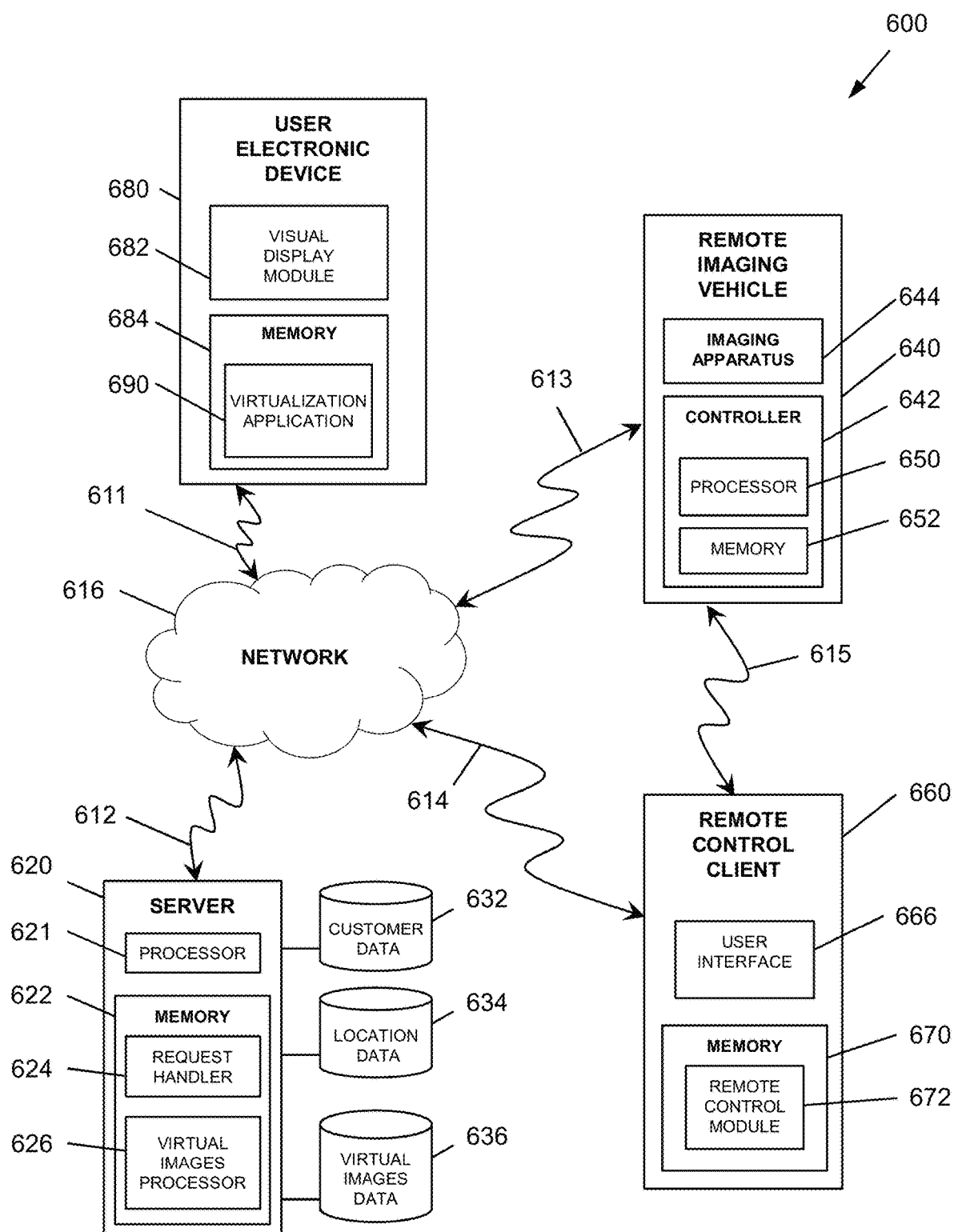
FIG. 6 depicts a block diagram of an exemplary remote imaging and visualization system for implementing techniques for remotely controlling an imaging vehicle and/or for remote virtual visualization of structures and/or locations.

FIG. 6 depicts a block diagram of an exemplary remote imaging and virtualization system 600 for implementing techniques for remotely controlling a remote imaging vehicle 640 and/or for remote virtual visualization of structures and/or areas. This remote imaging and virtualization system 600 may include the server 620, a remote imaging vehicle 640, a remote remote control client 660, a user electronic device 680, and a communication network 616.

The server 620 includes a processor 621 and a memory 622, which may include a request handler 624 and a virtual image processor 626. Data storage units which can be considered to be part of the server 620. One data storage units may include a customer data storage unit 632, a location data storage unit 634, or a virtual images data storage unit 636. The server 620 is connected to the network 616 via communication link 612, which can be either a wireless type or a wired type of communication link.

The remote control client 660 includes a user interface 666 and a memory 670, and the memory 670 may include a remote control module 672. The remote control client 660 communicates with the network 616 via a communication link 614. In some embodiments the remote control client 660 may communicate directly with the remote imaging vehicle 640 via a direct communication link 615.

The remote imaging vehicle 640 includes a controller 642 which may include a processor 650 and a memory 652. The remote imaging vehicle 640 further includes an imaging apparatus 644, such as a camera for capturing images of areas or structures. The remote imaging vehicle 640 communicates with the network 616 via a communication link 613 and/or with the remote control client 660 via the direct communication link 615.

The user electronic device 680 includes a visual display module 682 and a memory 684. The memory 684 may include the virtualization application 690. The user electronic device 680 may also include one or more processors, communication components, and user interface components (not shown). The user electronic device 680 is connected to the network 616 via communication link 611. Some or all of these components of the remote imaging and virtualization system 600 may be utilized to perform the techniques for remotely controlling a remote imaging vehicle and/or for remote virtual visualization of structures and locations described herein.

Figure 7:
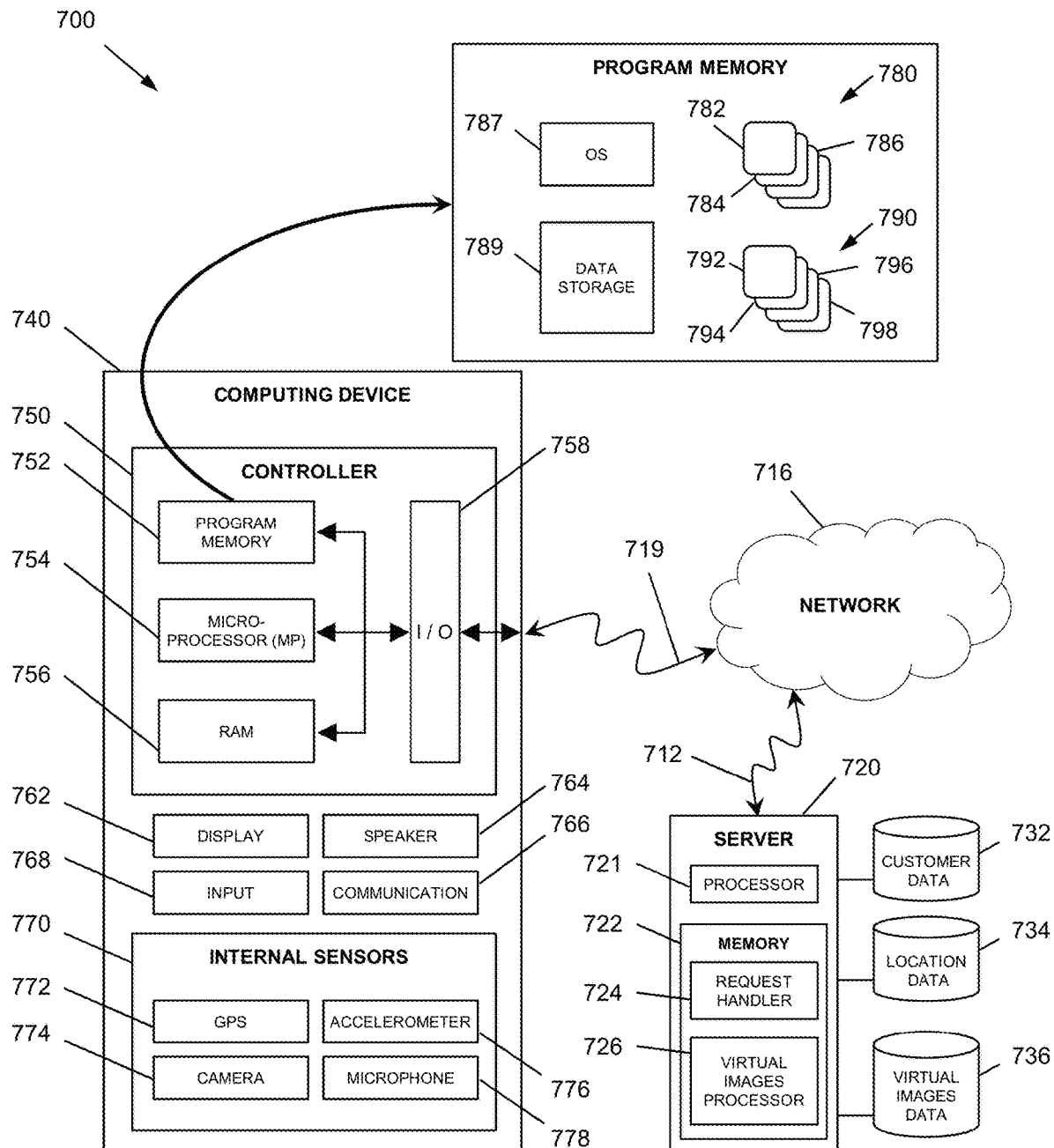
FIG. 7 depicts a block diagram of an exemplary computing device for use according to the embodiments described herein.

FIG. 7 depicts a block diagram of system 700 comprising of an example computing device physical hardware 740 interacting with the remote server 720. The system 700 described here may be used to generate a virtual model based upon sensor data regarding a physical environment, such as a field of inspection area 144 or 344. The virtual model may further be used to determine damage to objects or components of objects within the physical environment, such as structures or other property 310.

FIG. 7 illustrates a block diagram of an exemplary computing device 740, which may be used to implement one or more of the units 620, 640, 660, and 680, in accordance with the remote imaging and virtualization system 600 of this disclosure. Such computing device 740, may be a smartphone, a tablet computer, or similar mobile device capable of receiving and processing electronic information. The computing device 740 may include one or more sensors 770 which may provide sensor data (e.g. images) regarding a local physical environment in which the computing device 740 is operating. Such sensor data may include 2-D or 3-D images of the local physical environment, which may be captured by a camera 774 of the computing device 740. Additionally, in some embodiments, the computing device 740 may receive sensor data from one or more external sensors (not shown). The sensor data may be processed by the controller 750 to generate a virtual model (e.g. virtual 3D digital model) for user interaction, as discussed elsewhere herein. Additionally, or alternatively, the sensor data may be sent to one or more processors 721 of the server 720 through the network 716, and through communication links 712 and 719, for processing.

When the controller 750 (or other processor) generates the virtual model, a representation of the virtual model may be presented to the user of the computing device 740 using a display 762 or other output component of the computing device 740. User input may likewise be received via an input 768 of the computing device 740. Thus, the computing device 740 may include various input and output components, units, or devices. The display 762 and speaker 764, along with other integrated or communicatively connected output devices (not shown), may be used to present information to the user of the computing device 740 or others. The display 762 may include any known or hereafter developed visual or tactile display technology, including LCD, OLED, AMOLED, projection displays, head-mounted displays, refreshable braille displays, haptic displays, or other types of displays. The one or more speakers 764 may similarly include any controllable audible output device or component, which may include a haptic component or device. In some embodiments, communicatively connected speakers 764 may be used (e.g., headphones, Bluetooth headsets, docking stations with additional speakers, etc.). The input 768 may further receive information from the user. Such input 768 may include a physical or virtual keyboard, a microphone, virtual or physical buttons or dials, or other means of receiving information. In some embodiments, the display 762 may include a touch screen or may otherwise be configured to receive input from a user, in which case the display 762 and the input 768 may be combined.

The computing device 740 may further include sensors 770. In some embodiments, additional external sensors (not shown) may be communicatively connected to the computing device, either directly or through the network 716. The sensors 770 may include any devices or components mentioned herein, other extant devices suitable for capturing data regarding a physical environment, or later-developed devices that may be configured to provide data regarding a physical environment (including components of structures or objects within the physical environment). For example, an imaging apparatus of a remote imaging vehicle 640 may provide external sensor data to a remote client 660 or a user electronic device 680. The sensors 770 of the computing device 740 may further include additional sensors configured or intended for other uses, such as geolocation, movement tracking, photography, or spatial orientation of the device. Such additional sensors may, nonetheless, be used to provide sensor data for capturing data regarding the local physical environment to generate a corresponding virtual model.

Although discussion of all possible sensors of the computing device 740 would be impractical, if not impossible, several sensors warrant particular discussion. Disposed within the mobile computing device 740, the sensors 770 may include a GPS unit 772, an accelerometer 776, a camera 774, and a microphone 778. Any or all of these may be used to generate sensor data used in generating a virtual model of an area or structure. Additionally, other types of currently available or later-developed sensors may be included in some embodiments.

The GPS unit 772 and the accelerometer 776 may provide information regarding the location or movement of the computing device 740. The GPS unit 772 may use "Assisted GPS" (A-GPS), satellite GPS, or any other suitable global positioning protocol (e.g., the GLONASS system operated by the Russian government) or system that locates the position of the computing device 740. For example, A-GPS utilizes terrestrial cell phone towers or W-Fi hotspots (e.g., wireless router points) to more accurately and more quickly determine location of the computing device 740, while satellite GPS generally is more useful in more remote regions that lack cell towers or Wi-Fi hotspots. The accelerometer 776 may include one or more accelerometers positioned to determine the force and direction of movements of the mobile computing device 740. In some embodiments, the accelerometer 776 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 740 through three dimensional space can be established by combining the outputs of the X-axis, Y-axis, and Z-axis accelerometers using known methods.

Similarly, other components may provide additional positioning or movement sensor data. In some embodiments, a gyroscope may be used in addition to, or instead of, the accelerometer 776 to determine movement of the computing device 740. For example, a MEMS gyroscope may be included within the computing device 740 to detect movement of the computing device 740 in three dimensional space. Of course, it should be understood that other types of gyroscopes or other types of movement-detecting sensors may be used in various embodiments. Such sensor data may be used to determine a relative position of the computing device 740 within the physical environment. Such relative position information may be combined with other sensor data (such as visual image data from a camera 774) to provide data from which the computing device 740 can generate a virtual model. For example, multiple 2-D images of the same object within the physical environment may be compared based upon relative position information to determine the size, distance, and 3-D shape of the object based upon differences between the images.

The camera 774 may be used to capture still or video images of the local physical environment of the computing device 740 in the visual spectrum or other wavelengths, as well as objects or structures within the local physical environment. Such images may be used to generate and utilize virtual models in virtual spaces corresponding to physical environments in order to facilitate automated damage or loss assessment. The one or more cameras 774 may include digital cameras or other similar devices, such as charge-coupled devices, to detect electromagnetic radiation in the visual range or other wavelengths. It will be readily understood that one or more cameras 774 may be disposed within the computing device 740 and configured to generate either still images or video recordings. For example, multiple cameras 774 may be disposed to obtain stereoscopic images of the physical environment of a remote imaging vehicle 640, thereby better enabling the computing device 740 or server 720 to generate virtual models. Additional cameras 774 may also be communicatively connected to the computing device 740. In some embodiments, the camera 774 may include an infrared illuminator or other device to stimulate emission within a targeted range. Such infrared illuminators may be automatically activated when light is insufficient for image capturing. In further embodiments, the camera 774 may include a motorized swivel mounting and/or an adjustable lens to enable automated or remote adjustments to the direction or focus of the camera 774, including rotating or zooming in or out. Additional or alternative sensors 770 may be included in some embodiments to capture data regarding locations and shapes of objects within the physical environment.

The microphone 778 may be used to detect sounds within the local physical environment, such as spoken notes or comments by the user of the computing device 740. One or more microphones 778 may be disposed within the computing device 740 or may be communicatively connected thereto. For example, wired or wireless microphones 778 may be communicatively connected to the computing device 740, such as wireless speaker/microphone combination devices communicatively paired with the computing device 740.

The computing device 740 may also communicate with the server 720, the data sources 732, 734, and 736 or other components via the network 716. Such communication may involve the communication unit 766, which may manage communication between the controller 750 and external devices (e.g., network components of the network 716, etc.). The communication unit 766 may further transmit and receive wired or wireless communications with external devices, using any suitable wireless communication protocol network, such as a wireless telephony network (e.g., GSM, CDMA, LTE, etc.), a W-Fi network (802.11 standards), a WiMAX network, a Bluetooth network, etc. Additionally, or alternatively, the communication unit 766 may also be capable of communicating using a near field communication standard (e.g., ISO/IEC 18092, standards provided by the NFC Forum, etc.). Furthermore, the communication unit 766 may provide input signals to the controller 750 via the I/O circuit 758. The communication unit 766 may also transmit sensor data, device status information, control signals, or other output from the controller 750 to the server 720 or other devices via the network 716 and through communication links 712 and 719. The server 720 includes a virtual images data storage unit 736 to store the virtual images, in addition to a customer data storage unit 732 and a location data storage unit 734. The server 720 includes a processor 721 and a memory 722. The memory 722 includes a request handler 724 and a virtual image processor 726.

The computing device 740 may further include a controller 750. The controller 750 may receive, process, produce, transmit, and store data. The controller 750 may include a program memory 752, one or more microcontrollers or microprocessors (MP) 754, a random access memory (RAM) 756, and an I/O circuit 758. The components of the controller 750 may be interconnected via an address/data bus or other means. It should be appreciated that although FIG. 7 depicts only one microprocessor 754, the controller 750 may include multiple microprocessors 754 in some embodiments. Similarly, the memory of the controller 750 may include multiple RAM 756 or multiple program memories 752. Although the FIG. 7 depicts the I/O circuit 758 as a single block, the I/O circuit 758 may include a number of different I/O circuits, which may be configured for specific I/O operations. The microprocessor 754 may include one or more processors of any known or hereafter developed type, including general-purpose processors or special-purpose processors. Similarly, the controller 750 may implement the RAM 756 and program memories 752 as semiconductor memories, magnetically readable memories, optically readable memories, or any other type of memory.

The program memory 752 may include an operating system 787, a data storage 789, a plurality of software applications 780, and a plurality of software routines 790. The operating system 787, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 789 may include data such as user profiles and preferences, application data for the plurality of applications 780, routine data for the plurality of routines 790, and other data necessary to interact with the server 740 through the digital network 716. In some embodiments, the controller 750 may also include, or otherwise be communicatively connected to, other data storage mechanisms (e.g., one or more hard disk drives, optical storage drives, solid state storage devices, etc.) that reside within the computing device 740. Moreover, in thin-client implementations, additional processing and data storage may be provided by the server 720 via the network 716.

The software applications 780 and routines 790 may include computer-readable instructions that cause the processor 754 to implement the remote imaging and visualization functions described herein. Thus, the software applications 780 may include a remote image capture application 782 to control site imaging, a damage assessment application 784 to determine damage to objects, and a network communication application 786 to receive and transmit data via the network 716. The software routines 790 may support the software applications 780 and may include routines such as an image capture routine 792 to process image data from the camera 774, a model generation routine 794 for generating virtual 3D digital models, a virtual image generation routine 796 to generate images based upon virtual models 798 to determine an extent of damage based upon a virtual model. It should be understood that additional or alternative applications 780 or routines 790 may be included in the program memory 752, including web browsers or other applications of the sort ordinarily stored on computers or mobile devices.

In some embodiments, the computing device 740 may include a wearable computing device or may be communicatively connected to a wearable computing device. In such embodiments, part or all of the functions and capabilities of the computing device 740 may be performed by or disposed within the wearable computing device. Additionally, or alternatively, the wearable computing device may supplement or complement the mobile computing device 740. For example, the wearable computing device 740 may be a smart watch or head-mounted display, either of which may present representations of the virtual model.

Figure 8:
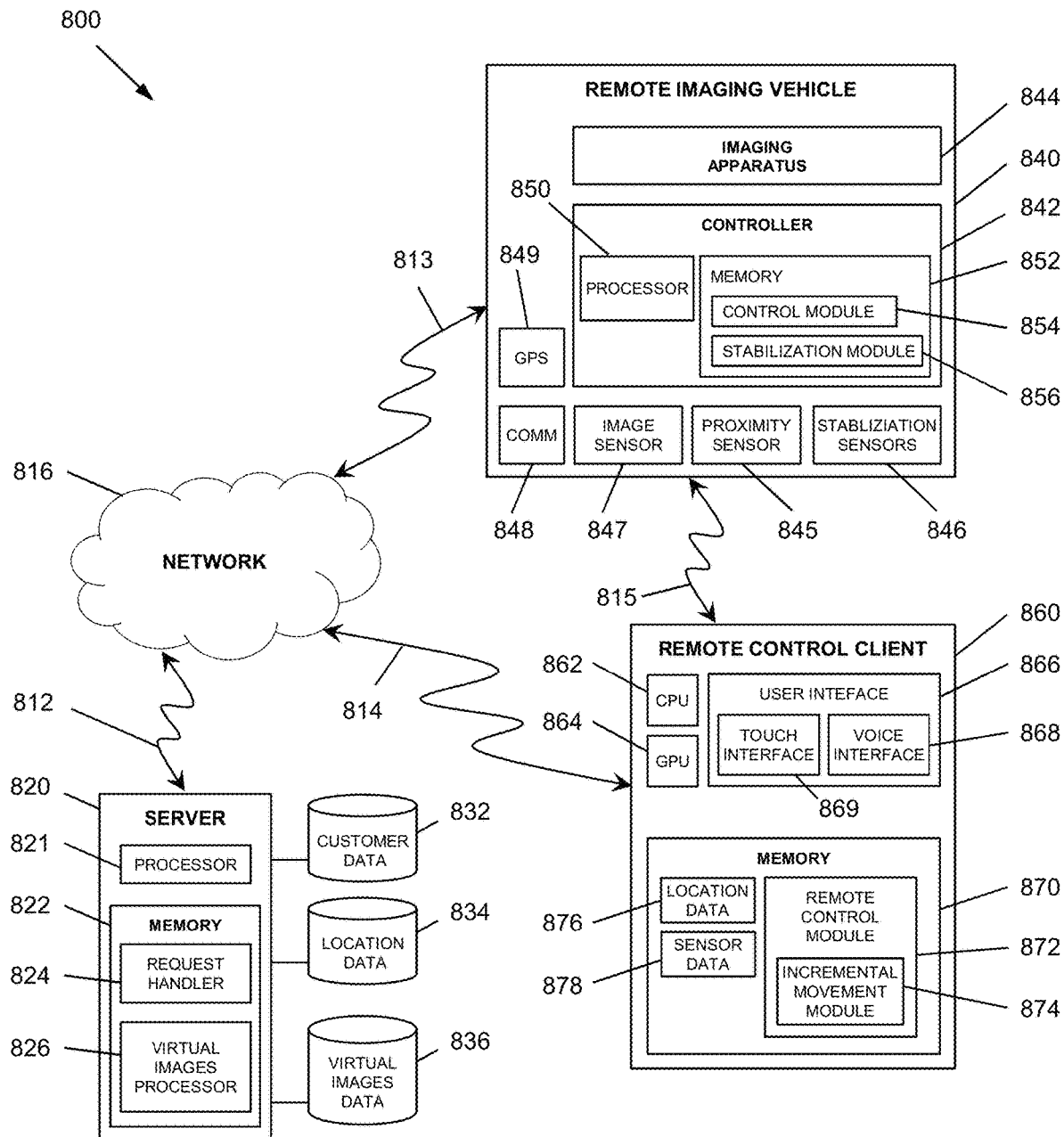
FIG. 8 depicts a block diagram of an exemplary imaging vehicle control system for remotely controlling an imaging vehicle.

FIG. 8 illustrates a block diagram of an exemplary imaging vehicle control system 800 for remotely controlling an imaging vehicle. The system 800 clarifies certain aspects of the remote imaging vehicle 640 and the remote control client 660. Additional details and components are depicted for the corresponding remote imaging vehicle 840 and remote control client 860.

The imaging vehicle control system 800 includes a remote control client 860 coupled to both a remote imaging vehicle 840 and a server 820 via a communication network 816 and communication links 812, 813, and 814. A communication link 815 communicatively connects the remote imaging vehicle 840 and the remote client 860. The remote control client 860 may be, for example, a laptop computer, a tablet computer, a smartphone, etc. The remote control client 860 includes a central processing unit (CPU) 862, a graphics processing unit (GPU) 864, a computer-readable memory 870, and a user interface 866. The user interface 866 may include a touch interface 869, voice interface 868, or similar interfaces. In various implementations, the touch interface 869 can include a touchpad a touchscreen, etc. In other implementations, the voice interface 868 may include any device that includes a microphone, such as a Bluetooth ear piece, a smartphone, etc. The memory 870 is a computer-readable non-transitory storage device that may include both persistent (e.g., a hard disk) and non-persistent (e.g., RAM) memory components, stores instructions (executable on the CPU 862 and/or the GPU 864) that may include a remote control module 872, location data 876, and sensor data 878 (on which the remote control module 872 operates). The remote control module 872 may include an incremental movement module 874 that allows a user to easily control the remote imaging vehicle 840 via step-like, incremental movements in which one incremental movement is in response to one user command.

According to various implementations the remote control module 872 operates as a separately executable software application, a plugin that extends the functionality of another software application such as a web browser, an application programming interface (API) invokable by a software application, etc. The instructions of the remote control module 872 may be executable on the CPU 862 and/or the GPU 864 directly, or may be interpreted by the CPU 862 at runtime. Further, the incremental movement module 874 may be provided as an integral part of the remote control module 872 or as a separately installable and downloadable component.

The remote imaging vehicle 840 includes an imaging apparatus 844. The remote imaging vehicle 840 includes a controller 842 that may communicate with one or more proximity sensors 845, one or more stabilization sensors 846, a Global Positioning System (GPS) unit 849, an image sensor 847, and a communications unit 848. The controller 842 includes a processor 850 that executes instructions from a computer-readable memory 852, such as a control module 854 and a stabilization module 856. The control module 854 may invoke the stabilization module 856 to retrieve data from the stabilization sensors 846 (i.e., sensors relating to avionics) to implement a control function, such as that associated with a control routine that performs PID (proportional-integral-derivative), fuzzy logic, nonlinear, etc. control to maintain the stability of the remote imaging vehicle 840. For instance, the stabilization sensors 846 may include one or more of a directional speed sensor, a rotational speed sensor, a tilt angle sensor, an inertial sensor, an accelerometer sensor, or any other suitable sensor for assisting in stabilization of an aerial craft. The stabilization module 856 may utilize the data retrieved from these stabilization sensors 846 to control the stability of the remote imaging vehicle 840 in a maintained, consistent hover that is substantially stationary in three dimensional space while maintaining close distance (e.g., 12-18 inches) to an object. Of course, the stabilization module 856 may implement any suitable technique of stabilizing the remote imaging vehicle 840 in a hover or stationary 3D position. The stabilization module 856 may additionally, or alternatively, be configured to stabilize the remote imaging vehicle 840 during non-stationary flight (i.e. when moving along a flight path).

The control module 854 may retrieve data from the proximity sensors 845 to determine nearby objects, obstructions, etc. that hinder movement of the remote imaging vehicle 840. These proximity sensors 845 may include any sensors that assists the control module 854 in determining a distance and a direction to any nearby object. The one or more proximity sensors 845 may include ultrasonic sensors, infrared sensors, LIDAR (Light Detection and Ranging), a stereo vision system (SVS) that may utilize the image sensors 847 (e.g., one or more cameras) to implement stereoscopic imaging techniques to determine a distance, and/or any other suitable method in determining the distance from the remote imaging vehicle 840 to a nearby object.

The GPS unit 849 may use "Assisted GPS" (A-GPS), satellite GPS, or any other suitable global positioning protocol or system that locates the position the device. For example, A-GPS utilizes terrestrial cell phone towers or wi-fi hotspots (e.g., wireless router points) to more accurately and more quickly determine location of the device while satellite GPS generally are more useful in more remote regions that lack cell towers or wi-fi hotspots. The communication unit 848 may communicate with the server 820 via any suitable wireless communication protocol network, such as a wireless telephony network (e.g., GSM, CDMA, LTE, etc.), a wi-fi network (802.11 standards), a WiMAX network, a Bluetooth network, etc.

In an example scenario, the server 820 receives a request that specifies a customer, a structure, a pre-stored route, etc. The server 820 in response retrieves insurance data (e.g., customer biographical information, type of property, etc.), and location data (e.g., a property location of a customer, etc.) from a customer database 832 and a location database 834, respectively. The server 820 then provides the customer data, the location data, and appropriate indications of how certain portions of the customer data and the location data are linked, to the remote control client 860 as part of the location data 834. The remote control client 860 may use this location data to determine a geographic location that the remote imaging vehicle 840 is initially sent. Of course, the customer database 832 and the location database 834 may be disposed within the remote control client 860 depending on implementations. The server 820 includes a virtual images data to store the virtual images. The server 820 includes a processor 821 and a memory 822. The memory 822 includes a request handler 824 and a virtual image processor 826.

Figure 9:
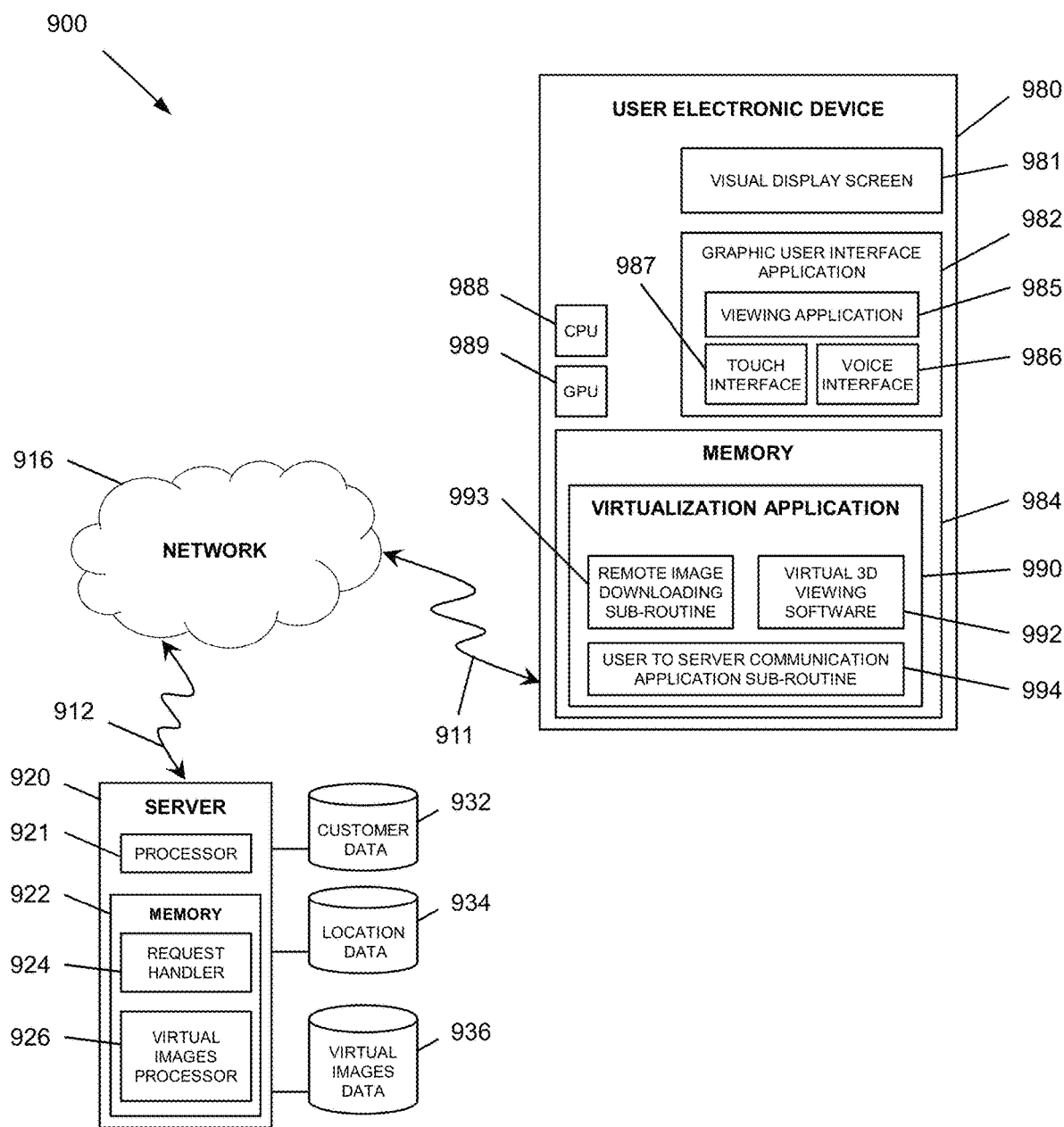
FIG. 9 depicts a block diagram of an exemplary remote visualization system for remote virtual visualization of structures and locations.

FIG. 9 illustrates a block diagram of an exemplary remote virtualization system 900 in for remotely controlling an imaging vehicle. The system 900 clarifies certain aspects of the user electronic device 680. Additional details and components are depicted for a corresponding user electronic device 980. The server 920 may be the same as the server 620. The server 920 may include a processor 921 and a memory 922, which includes a request handler 924 and a virtual image processor 926. The server 920 may include or be connected to data storage units including a customer data storage unit 932, a location data storage unit 934, and a virtual images data storage unit 936. The server 920 may be connected to the network 916 via communication link 912, which according to example can be a wireless or wired.

The user electronic device 980 may include a visual display module 981, a graphical user interface (GUI) application 982, and a memory 984. The user electronic device may also include a CPU 988 and a GPU 989. The GUI application 982 may include a viewing application 985, a touch interface 987, and/or a voice interface 986. The memory 984 may likewise include a virtualization application 990. The virtualization application 990 may include a remote image downloading sub-routine 993, a virtual 3D viewing software 992, and a user to server communication application sub-routine 994. The user electronic device 980 may be connected to the network 916 via the communication link 911.

Figure 10:
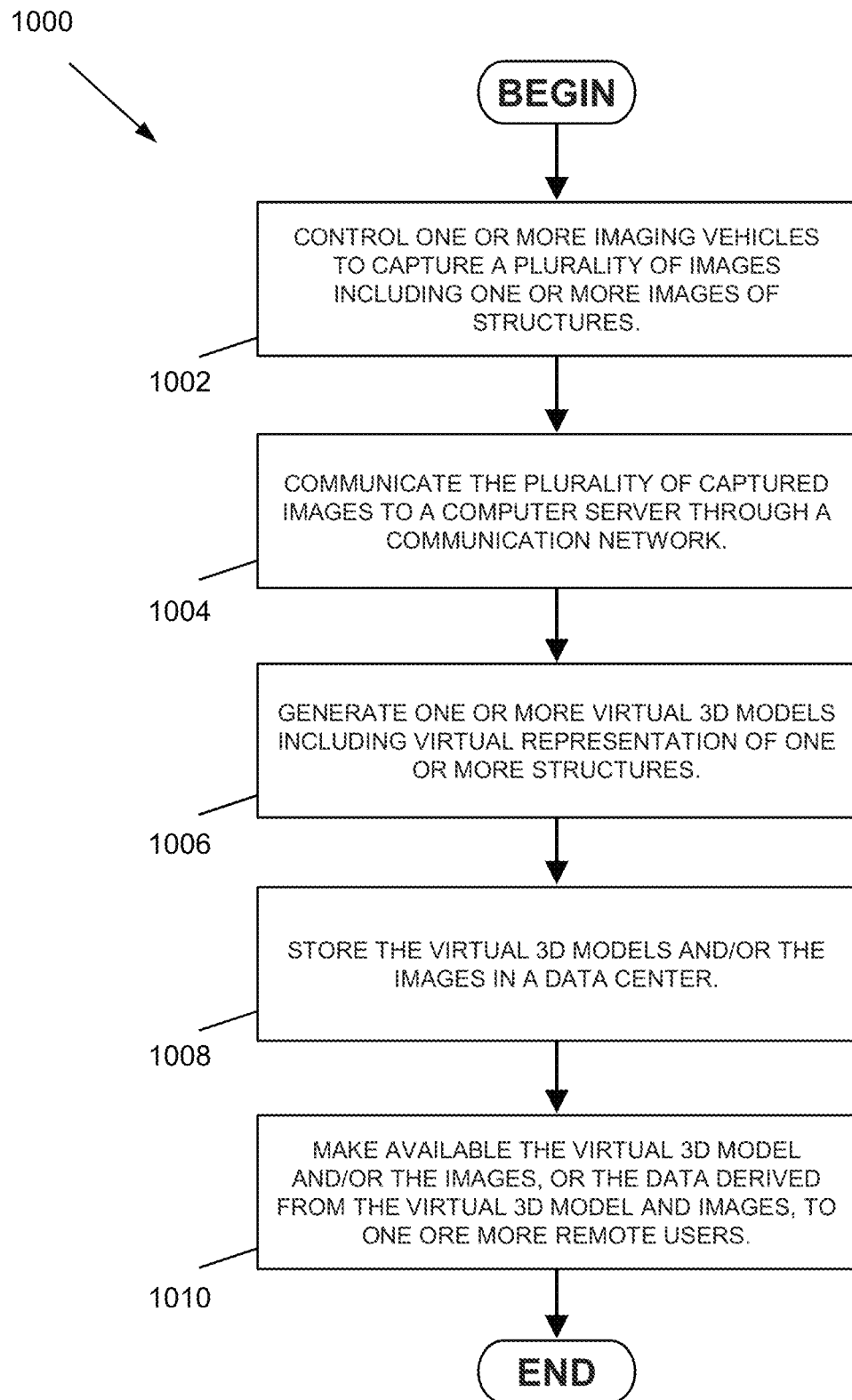
FIG. 10 depicts a flow chart of an exemplary virtual 3D digital model and method.

FIG. 10 depicts a flow chart of an exemplary virtual 3D model and method 1000. The process 1000 may begin with controlling one or more remote imaging vehicles 640 to capture a plurality of images, including one or more images of structures and/or locations (block 1002). The remote imaging vehicles 640 may be controlled by or in response to instructions from the server 620 to capture images of an area or a structure within an area. In some embodiments, the remote control client 660 may receive instructions from the server 620 and control the remote imaging vehicle 640 according to such instructions. The process 1000 may next include communicating the plurality of captured images to the server 620 through a communication network 616 (block 1004). In some embodiments, a remote control client 660 located in proximity to the remote imaging vehicles 640 may receive and preprocess the captured images or other data, which preprocessed data may be sent to the server 620. Such embodiments may be of particular advantage when there is limited data communication with the geographic area to be imaged. One or more virtual 3D digital models including virtual representation of one or more structures and/or locations may then be generated (block 1006) and stored (block 1008). Generating the virtual 3D digital models may include processing the images or other data via photogrammetric or similar processes to identify coordinates of points within the data associated with edges, vertices, or surfaces of areas or structures of interest, which may then be recorded for later user in generating virtual representations of the areas or structures. The virtual 3D digital model and/or the representations of the virtual 3D digital models, or the data derived therefore, may be made available to one or more remote users (block 1010), as discussed elsewhere herein.

Figure 11:
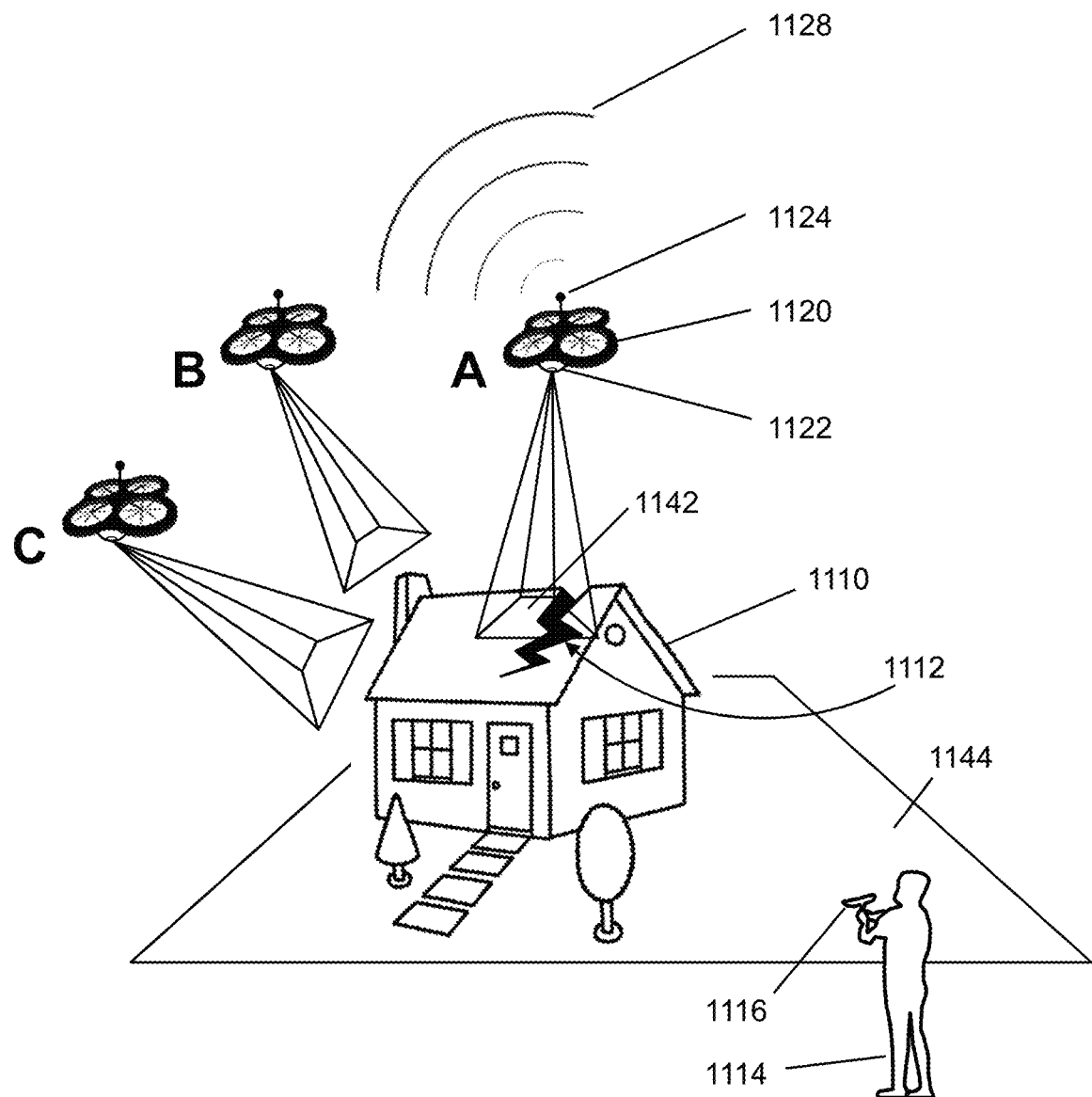
FIG. 11 depicts an exemplary damaged structure during inspection by an imaging vehicle.

FIG. 11 depicts an exemplary damaged structure during inspection by an imaging vehicle. An on-site inspector agent 1114, may use an imaging vehicle 1120 to perform the function of inspecting and imaging of the structure 1110 after damage has occurred. As depicted in FIG. 11, there may be damaged portions 1112 of the structure 1110 that are damaged, and the imaging vehicle 1120 may capture images of these damaged portions 1112 of the structure 1110. The inspector agent 1114, may use a control unit 1116 to control the imaging vehicle 1120. The imaging vehicle 1120 may be a remote imaging vehicle 640 or any other imaging vehicle described herein. The imaging vehicle 1120 may be an aerial drone that is equipped with an imaging apparatus 1122 (e.g. an image sensor 847) for capturing images and a data transmission apparatus 1124 (e.g. a communication unit 848) for transmitting communication signal 1128 for the transmission of images and associated data to a central processing server (e.g. server 620) through a wireless network (e.g. network 616). The imaging vehicle 1120 could be an autonomous vehicle that does not require an on-site controller or pilot to control it. The field of inspection 1144 is the area within the boundaries of the property which is to be inspected. The field of imaging 1142 is the specific area that is imaged during one image cycle (e.g. one digital photo image).

Under scenario A the imaging vehicle 1120 is hovering above the structure 1110, and the imaging vehicle 1120 is capturing images with the imaging apparatus 1122 pointing straight down at a vertical angle with respect to the plane of the field of inspection 1144. This arrangement is depicted only as one example among multiple possible examples. The imaging vehicle 1120 may traverse the field of inspection 1144 and capture a plurality of images of the structure 1110 with each image having a field of imaging 1142 associated with that particular image. The field of imaging 1142 of the various images that are captured may have an overlap with other images which may be set and/or adjusted according to various imaging algorithms and/or adjustment of various settings of the image capturing software routines or image capturing hardware components.

Under scenario A, the imaging vehicle 1120 traverses the field of inspection 1144 at a particular height, and along the path of a predetermined travel grid pattern, and captures images of the structure 1110 (e.g. at predetermined intervals) with the imaging apparatus 1122 pointing straight down. The imaging vehicle 1120 can stay at the same altitude (scenario B) as before or alternatively it can move to a different altitude (scenario C), for example to a lower altitude, for further imaging. If further imaging is desired, the imaging vehicle may point its imaging apparatus 1122 at a predetermined angle towards the structure 1110 and capture images at that angle, such as a 60 degrees angle (as shown in scenario B) with respect to the plane of the field of inspection 1144. In this fashion the imaging apparatus 1122 of the imaging vehicle 1120 can capture multiple images of the side of the structure 1110 as it traverses a path around the structure 1110. In doing so the imaging apparatus 1122 captures multiple images of the sides of the structure 1110. Once this process of capturing images from the side of the structure 1110 is concluded, the imaging vehicle 1120 can move to an even lower altitude (scenario C) if desired. For example, the imaging vehicle 1120 may move to an altitude that is approximately the same as the height of a portion of the structure 1110 and adjust the angle of its imaging apparatus 1122 so that the imaging apparatus 1122 is pointing at the structure 1110 at an acute angle of with respect to the plane of of the field of inspection 1144. The imaging vehicle 1122 may then traverse around the structure 1110 and in doing so capture a plurality of images of the structure 1110 at a predetermined angle.

In performing the above described maneuvers above and around the structure 1110 the imaging vehicle 1120 captures multiple images (or other set of data), possibly hundreds or even thousands of images, from which a virtual 3D digital imaging software 1260 (depicted in FIG. 12), or similar software, can construct or generate a virtual 3D digital model (e.g. the virtual 3D digital model 1220 depicted in FIG. 12) of the structure 1110. Using this virtual 3D digital model the virtual 3D digital imaging software can generate multiple representations of the virtual 3D digital models that depict the structure 1110 from various perspectives, various heights, various angles, and various distances.

Figure 12:
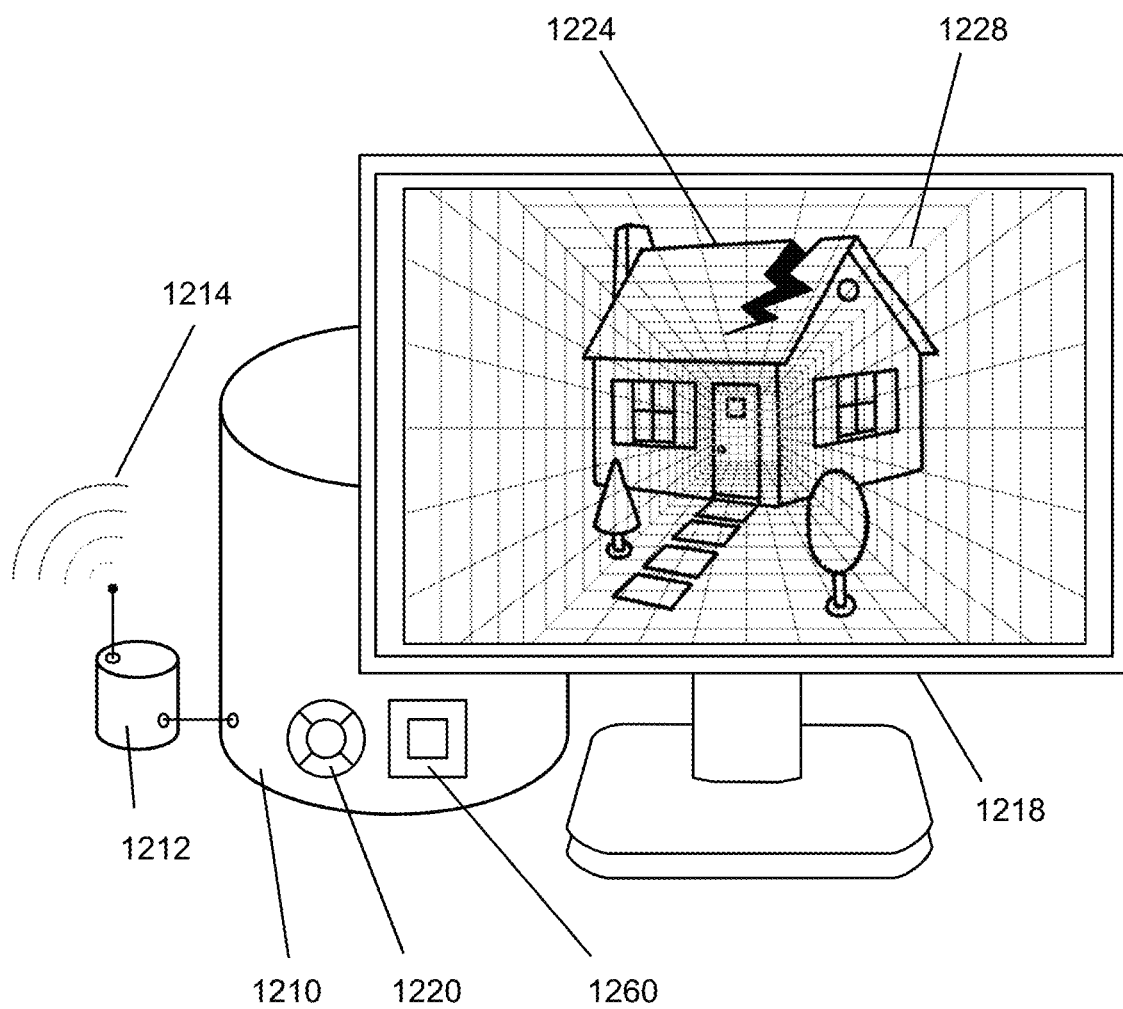
FIG. 12 depicts presentation of an exemplary virtual 3D digital model of the exemplary damaged structure.

FIG. 12 illustrates presentation of an exemplary virtual 3D digital model of the structure 1110, by displaying a representation of the virtual 3D digital model 1224 of the structure 1110 within a virtual 3D digital environment 1228 on a user interface unit 1218. The representation of the virtual 3D digital model 1224 may be generated by a virtual 3D digital imaging software 1260 from a virtual 3D digital model 1220 of the structure 1110. This virtual 3D digital model 1220 may be generated by a 3D virtual imaging software 1260 using the images and/or data acquired by the imaging vehicle 1120 operating in the field. The images and the data that were captured by the imaging vehicle 1120 may be transmitted in signals 1214 through the communication network to the server 1210 and received by communication link 1212 associated with the server 1210. A virtual 3D digital model 1220 of the inspected property may be generated by the sever 1210 using the virtual 3D digital imaging software 1260. This virtual 3D digital model 1220 may then be stored for future reference in data storage units that are associated with the server 1210. In some embodiments virtual 3D digital models of the same property generated based on images that are captured before and after the damages can be compared with each other in order to assess damage and/or changes to the property.

Figure 13:
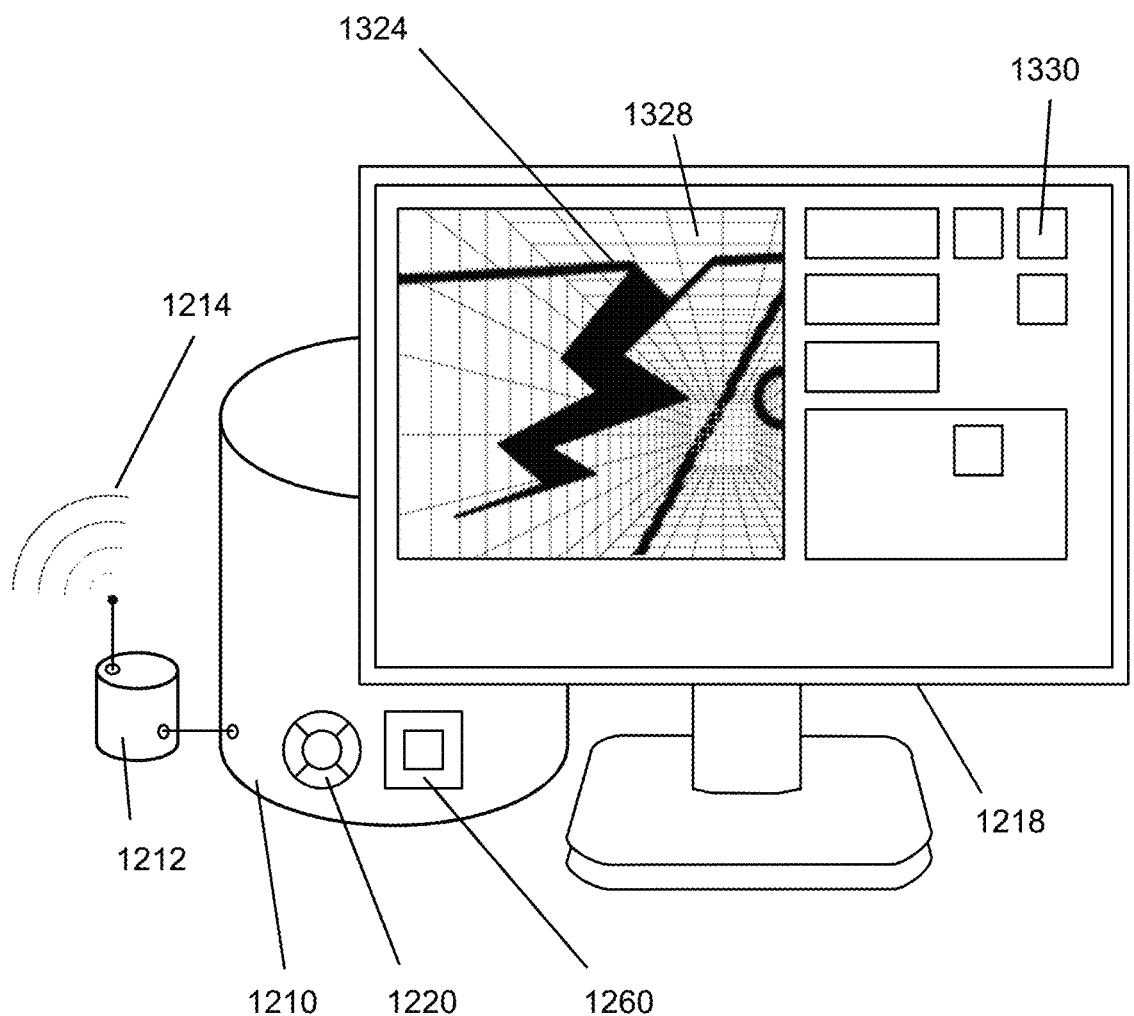
FIG. 13 depicts an exemplary display of the virtual 3D digital model illustrating damage to the structure.

FIG. 13 depicts an exemplary display of a portion of the virtual 3D digital model 1220 of the damaged structure 1110 that was inspected and imaged. From this virtual 3D digital model 1220 the server 1210, using the virtual 3D digital imaging software 1260, may generate multiple representations of the virtual 3D digital models 1324 that are displayed within a virtual 3D digital imaging environment 1328 on the user interface unit 1218. The representation of the virtual 3D digital model 1324 of the damage structure 1110 that is presented within a virtual 3D digital environment 1328, after the property was damaged, may represent an area or areas of interest, such as the damaged portion of the structure 1110 for detailed analysis by machine vision algorithms and/or human experts. Various data and/or analysis of information 1330 may be displayed on the screen in graphical, numerical, and/or text formats.

Figure 14:
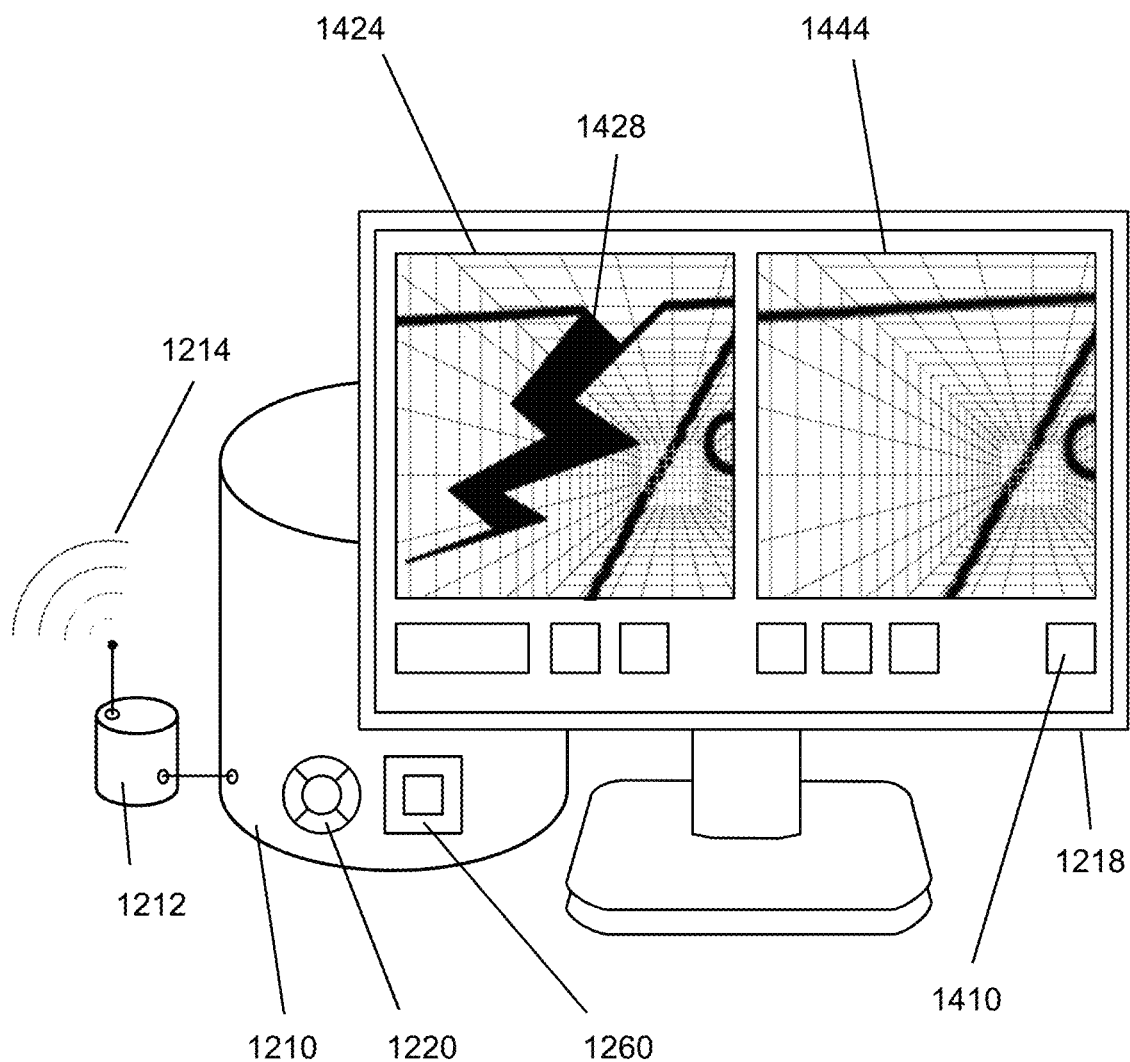
FIG. 14 depicts an exemplary comparison display for comparing representations of the virtual 3D digital models of the inspected structure.

FIG. 14 depicts an exemplary comparison display, displaying simultaneously in a side-by-side fashion on the same user interface display 1218, a representation of the virtual 3D digital model 1424 depicting a damaged portion 1428 of the structure 1110 next to a representation of the virtual 3D digital model 1444 depicting the same portion of the structure 1110 before any damage has occurred. The representations of the virtual 3D digital models 1424 and 1444 may be evaluated or compared by software running on the server 1210 or by a human receiver (i.e. a user of the server 1210 via the user interface display 1218). In some embodiments, the server 1210 may automatically identify the damage based upon an algorithmic comparison of the representations of the virtual 3D digital models 1424 and 1444, then present information regarding the damaged portion 1428 to the receiver for verification. The same user interface display 1418 may likewise present various data and/or analysis information 1410 which may be displayed on the screen in graphical, numerical, and/or text formats.

Figure 15:
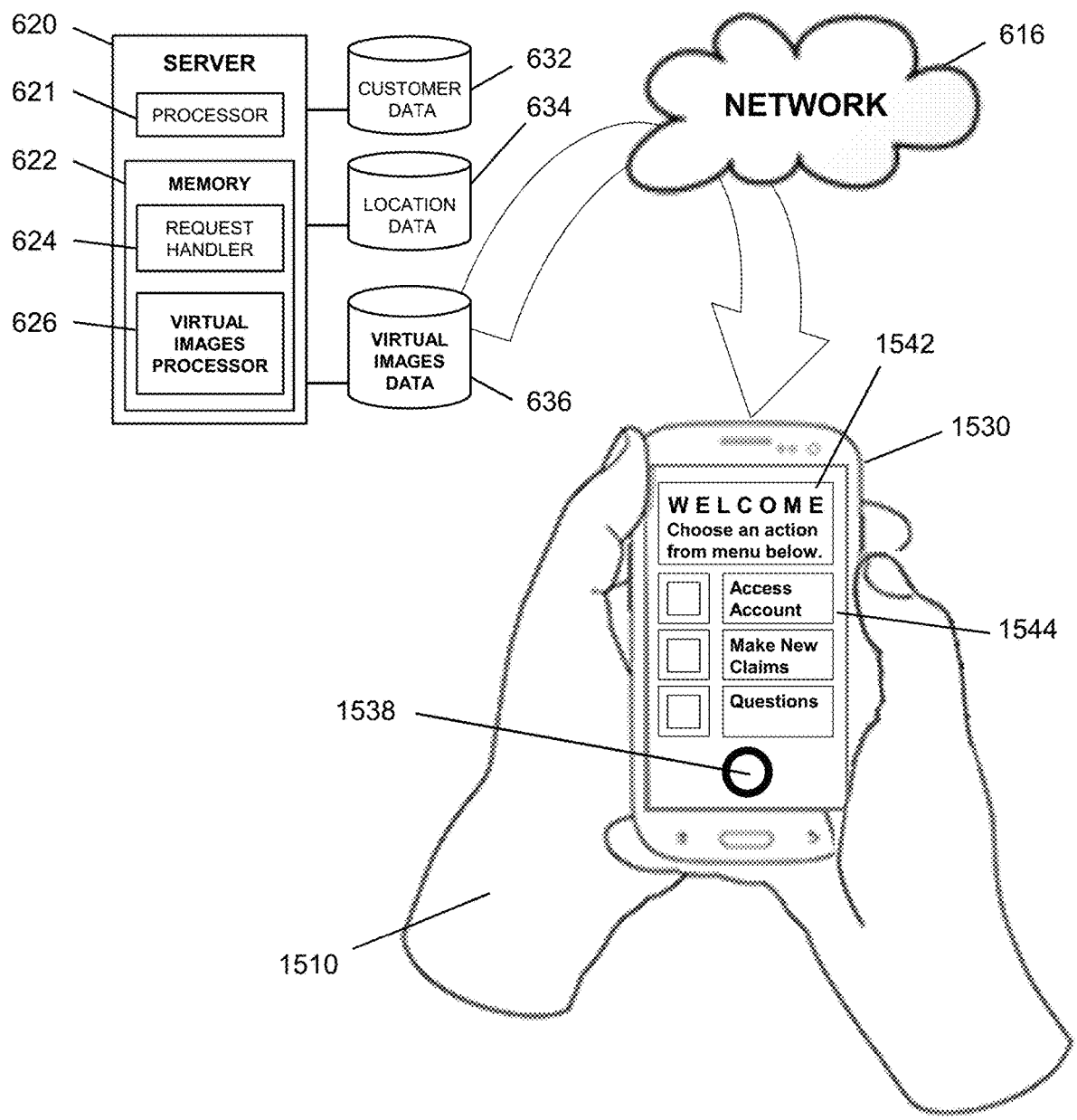
FIG. 15 depicts an exemplary virtualization software application tool.

FIG. 15 depicts an exemplary virtualization software application tool. The remote user 1510, who may be the owner of a property that has been damaged, may use a remote server 620 (e.g. the server 1210) using an electronic device 1530 (e.g. a user electronic device 680 or remote control client 660) that has a software application tool 1538 for enabling user access to virtual models. The software application tool 1538, may be a user interactive application that is installed on the device 1530 in order to facilitate interaction between user device 1530 and the remote server

620. Upon successful connection to the remote server 620 the user electronic device 1530 may display on its display screen an opening greeting message 1542, which may be received from the remote server 620. A main menu of the user interface screen presenting user various action options 1544 may be also displayed on the screen of user electronic device 1530. The remote server 620 communicates with the user electronic device 1530 through the communication network 616.

Figure 16:
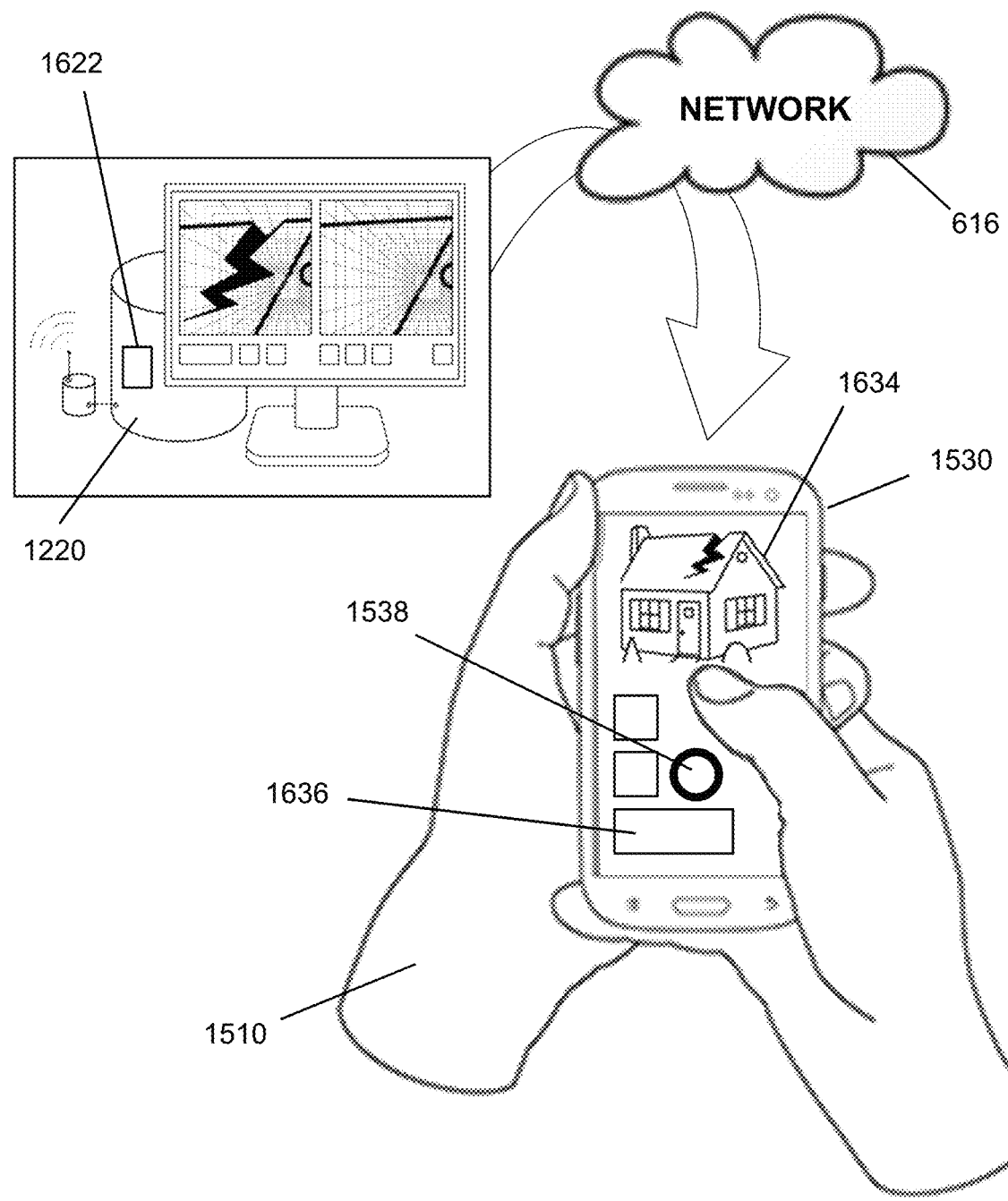
FIG. 16 depicts an exemplary display of the inspected structure via the virtualization software application tool.

FIG. 16 depicts an exemplary display of an inspected structure via the virtualization software application tool. Digital information, data, and images 1622 (including data and images) may be retrieved from the server 1220 and associated data storage unit, may be made available to the remote user 1510, through the communication network 616. The user 1510 may be an owner of the property 1110 that was damaged (i.e. the damaged structure 1110). For example, representations of the virtual 3D digital models 1634 of the damaged property 1110 may be displayed on the display screen of the user electronic device 1530 for review by the user 1510. Other relevant data and information 1636 may also appear on the display screen of the user electronic device 1530 in graphical, numerical, and/or text formats. This may be controlled by a virtualization software application of the user interactive application 1538 in order to facilitate interaction between user 1510 and the server 1220.

Figure 17:
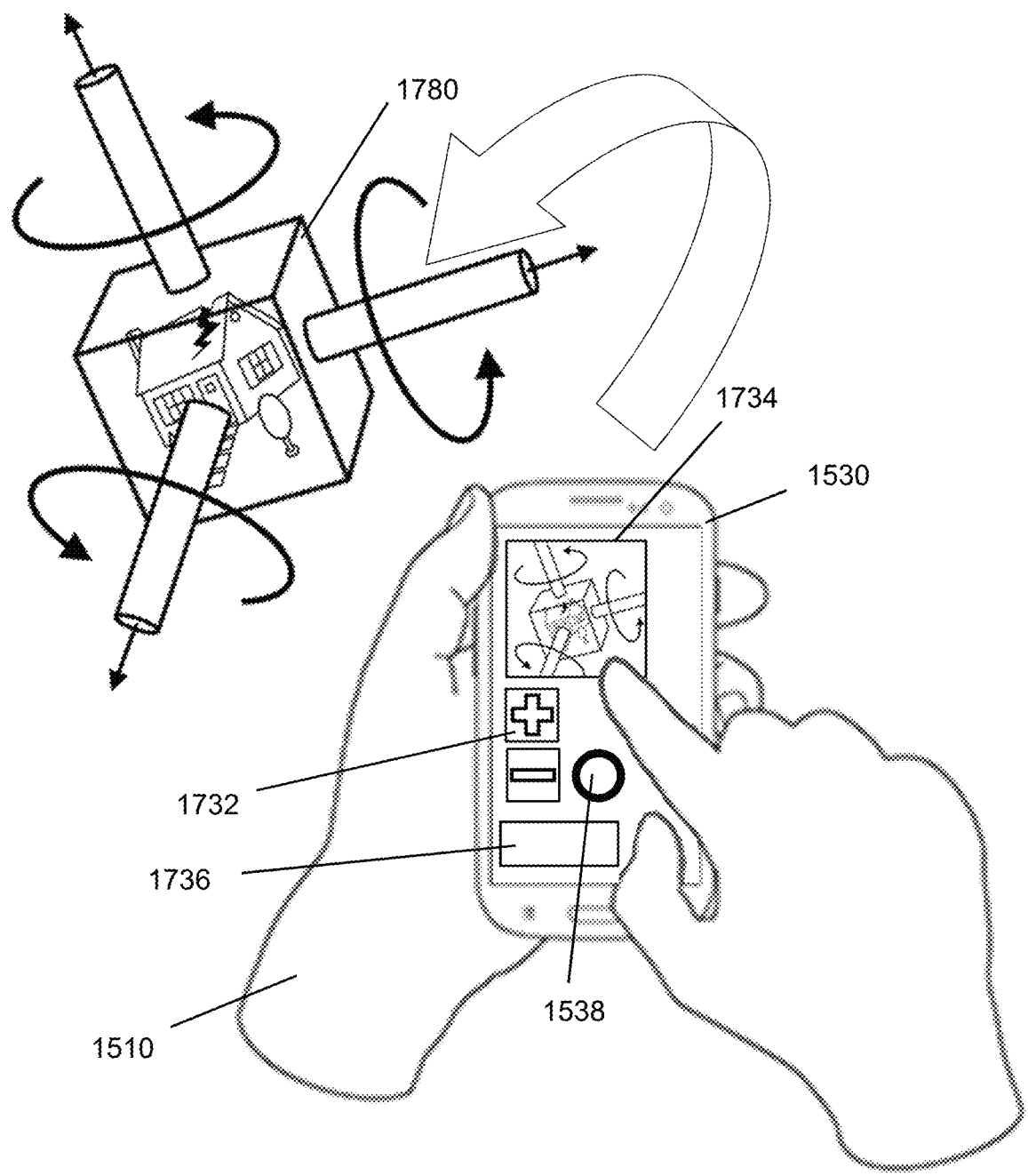
FIG. 17 depicts an exemplary view manipulation display of the virtualization software application.

FIG. 17 illustrates an exemplary view manipulation display of the virtualization software application tool depicting how the user 1510, may use the user interactive application 1538 to inspect the damaged property 1110 from various perspectives and at different zoom factors. The image depicted on the screen of the user electronic device 1530 of the user may be a representation of the virtual 3D digital model 1780 of the damaged structure 1110 which is a virtual representation of the property. Representations of the virtual 3D digital models may be presented as 2D images on the user electronic device 1510, such as image 1734. Such representations of the virtual 3D digital models or virtual 3D digital models may be stored at the server 1220 of an insurer and accessed by a remote user 1510 using the user electronic device 1530. Through the user of control features 1732 on the display screen, the user can manipulate the image to view it from different perspectives. For example the image may be rotated, zoomed in, zoomed out, or translated. Points of interest on the image, such as damaged portions 1428 of property, may be indicated or marked. Other relevant data and information 1736 may be displayed on the screen in graphical, numerical, and/or text formats. Such information may include, according to an example, the geographical location coordinates of the damaged property.

Figure 18:
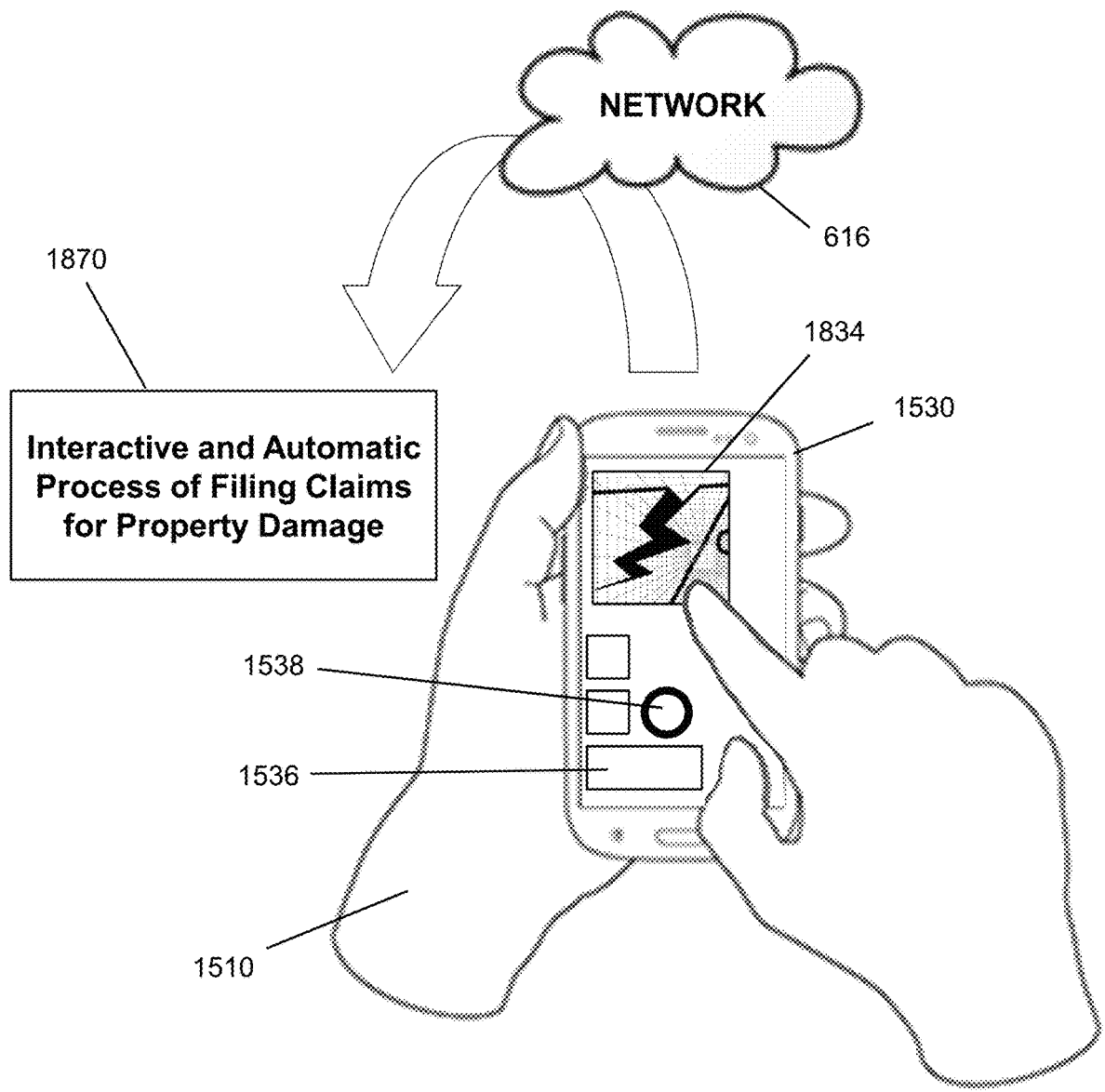
FIG. 18 depicts an exemplary communication display of the virtualization software application.

FIG. 18 depicts an exemplary communication display of the virtualization software application tool for an interactive and/or automatic process of filing claims 1870 for property damage. The remote user 1510 may use the user electronic device 1530 and the user interactive software application 1538 to communicate with the server 1220 of the insurer in order to get access information, retrieve images (e.g. image 1834), access a customer account, ask questions, and/or file claims. Similarly, the insurer can communicate with the remote user 1510 through the interactive application software application 1538 to expedite the process of filing the claims for property damage and facilitate efforts of the user 1510 to receive compensation as soon as possible.

Figure 19:
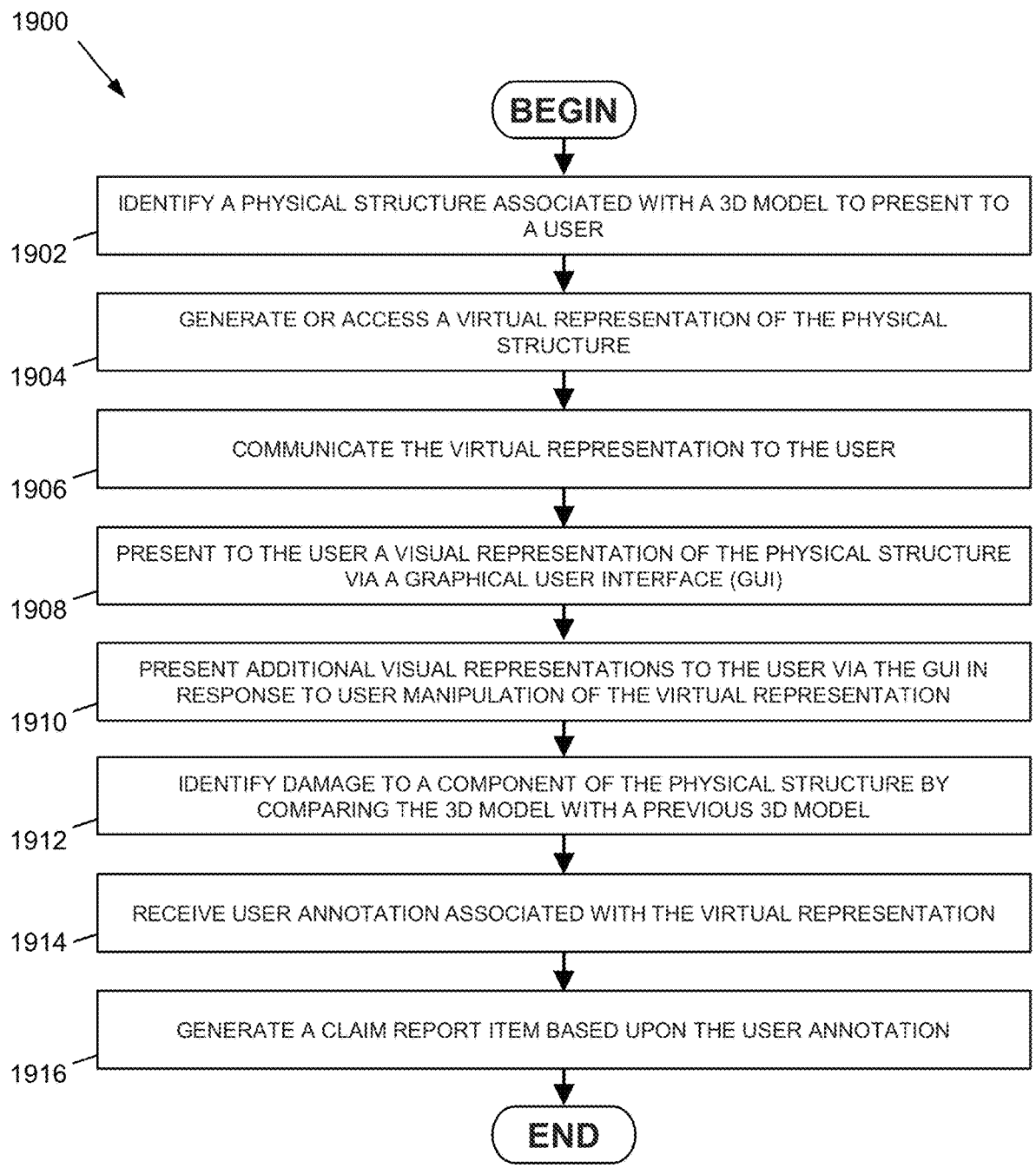
FIG. 19 depicts a flow chart of an exemplary remote visualization method for identifying, generating, accessing, communicating, and/or presenting data and/or virtual images to a user.

FIG. 19 depicts a flow chart of an exemplary remote virtualization method 1900 for identifying, generating, accessing, communicating, and/or presenting data and representations of the virtual 3D digital models to a user. The process 1900 may begin with identifying a physical structure associated with a virtual 3D digital model to present to a user (block 1902). The process 1900 may next include generating or accessing a virtual representation of the physical structure (block 1904) and may then continue by communicating the virtual representation to the user (block 1906). The process 1900 may then present to the user a visual representation of the physical structure via a GUI (block 1908). The process 1900 may continue by presenting additional visual representations to the user via the GUI in response to user manipulation of the virtual representation (block 1910). Damage to a component of the physical structure may be identified by comparing the virtual 3D digital model with a previous virtual 3D digital model (block 1912). The user may receive a user annotation associated with the virtual representation (block 1914). A claim report item may be generated based upon the user annotation (block 1916).

At block 1902, the sever 620 may identify a physical structure to model. The physical structure may be identified as a building, infrastructure component (e.g., a road, a bridge, or power distribution station), or other structure. The physical structure may be identified based upon a geographical location, such as by a street address or by geolocation coordinates (e.g., coordinates used by GPS systems). In some embodiments, the server 620 may identify the structure to model based upon receiving a preliminary request from a user indicating the physical structure, which for example may be a structure that includes a building that is associated with the user. Such request may be received from a user electronic device 680. Upon receipt of this request by the server 620 from the user, the server may transmit communication signals to a controller device (e.g., the remote control client 660) that is associated with one or more imaging vehicles 640. Using these communication signals, the server 620 may instruct the imaging vehicle 640 to capture one or more images of the structure using the imaging apparatus 644.

Alternatively, the server 620 may identify the physical structure by analysis of a previously generated virtual 3D digital model. The server 620 may evaluate models generated for an area (e.g., a town recently suffering flooding) to determine one or more characteristics of each of a plurality of structures. The determined characteristics may include characteristics associated with damage, such as whether the structure has a roof or whether the structure is immediately surrounded by water. In some embodiments, the characteristics may include proximity to other structures or locations of known damage. In further embodiments, the characteristics may be generated by comparison of a current (i.e., post-catastrophe) model with an older (i.e., pre-catastrophe) model, such as by identifying differences in the models beyond a threshold associated with significant changes to the structure. The server 620 may identify the structure based upon such characteristics by identifying the virtual 3D model that includes the virtual 3D model of the structure. Thus, the server 620 may identify the physical structure based upon the one or more characteristics associated with the virtual 3D model of the structure. In some embodiments, the server 620 may transmit a message to the user (e.g., to the user electronic device 680) indicating that the a representation of the physical structure is available for viewing. Such message may be presented to the user as an e-mail message, an SMS text message, or a notification within a custom application installed on the user electronic device 680. The server 620 may send many such messages to various users at approximately the same time, and the user may identify the physical structure by selecting an option to view the visual representation of the virtual 3D digital model. In some embodiments, a user may receive options to view multiple models representing various structures or portions of structures, in which case the user may select from among the available models.

At block 1904, the server 620 may generate or access a virtual representation of the identified physical structure. In embodiments in which the virtual representation is generated, the process of generating the virtual 3D digital model and/or a virtual representation of a physical structure based upon such model may be performed, as discussed elsewhere herein. As part of the process of generating and/or accessing the virtual representation of the structure using the virtual 3D model, the server 620 may perform polygon simplification on the virtual 3D model until the virtual representation of the physical structure is below a data size limit for transmission. Although such process reduces the level of detail available to the user, such simplification may be necessary to reduce the data to be transmitted. Preferably, such polygon simplification is implemented in such a manner as to remove details of the visual representation for portions of the representation that are determined to be unlikely to be damaged. Such determination may involve comparison with previously generated models, geometric analysis of surfaces within the model to identify damaged or undamaged portions (based upon smoothness, symmetry, etc.), or statistical analysis of known locations of damage to similarly situated structures.

At block 1906, the server 620 may communicate data including at least a portion of the virtual representation to the user electronic device 680. Such data may be sent to the user as part or all of the virtual 3D digital model, a mesh or other encoding of a graphical representation of the model, a set of images depicting views of the model, or other representations of the physical structure based upon the virtual 3D digital model. In addition to sending the virtual representation data to the user, the server 620 may also communicate one or more images of the structure in some embodiments. For example, the server 620 may transmit an electronic copy of one or more digital images of the structure captured by one or more remote imaging vehicles 640. In further embodiments, the user may specifically request such images by indicating a portion of the virtual representation for further assessment, such as a portion of a modeled structure that may be damaged.

At block 1908, the visual representation of the physical structure may be presented to the user via a GUI running on the user electronic device 680. The GUI may be configured to enable the user to manipulate the virtual representation to view additional perspectives or visual representations of part or all of the a physical structure. Such presentation of the physical structure to the user may include generating or rendering the relevant portion or portions of the visual representation of the virtual model for display using a display screen, as discussed elsewhere herein. The GUI may be further configured to receive indications of user manipulation of the visual representation associated with changes to perspective, such as rotating the virtual representation, zooming in, zooming out, or changing the viewing angle.

At block 1910, the user electronic device 680 may present additional visual representations to the user via the GUI in response to user manipulation of the virtual representation. The GUI may be configured to receive an indication of a user manipulation of the visual representation, such as changing perspective by swiping the screen or rotating the user electronic device 680. When such an indication is received, the GUI may update the visual representation to present an additional view of the modeled structure to the user. For example, the GUI may render a series of alternate perspectives of the structure as the user rotates the representation to examine different portions of the structure. Likewise, the GUI may render a new image as the user zooms in on an area of interest, such as an area that may be damaged. In some embodiments, the GUI may request and receive additional data from the server 620 in order to present an additional visual representation to the user. For example, the GUI may request more detail regarding a portion of the structure when the user zooms in on the portion.

At block 1912, the server 620 may identify damage to a component of the physical structure based upon the virtual 3D digital model of the structure. The damaged component may be identified by comparing the 3D model with a previous 3D model of the structure that is based upon data captured prior to a recent damage-causing event. The server 620 may access a previously generated 3D model of the physical structure that was generated prior to any damage and compare this previous 3D model with the current 3D model generated using images that were captured after the damage. In comparing the two images, the server 620 may identify damage to a component of the physical structure based upon identified differences between the before-the-damage and after-the-damage 3D models, such as by identifying missing components or changes in surfaces or edges within the models. In some embodiments, the server 620 may identify damaged components of the structure based upon evaluation of only the current 3D model by identifying a set of data points of the model that do not match expected criteria. For example, a roof may be determined to be missing if the model includes interior walls of the structure based upon aerial images (which walls would only be visible when the roof is missing). As another example, a broken window may be identified based upon model data indicating edges of windowpanes within the interior of the window (indicating broken panes). Information regarding the damaged component may be presented to the user or may be stored for use in insurance claim generation and processing.

At block 1914, the GUI may receive a user annotation associated with the virtual representation. The user annotation may include information associated with a damaged component of the structure or may include other information relating to the structure, such as information relevant to an insurance claim. In some embodiments, the user may be prompted to add an annotation associated with a component identified as damaged by the server 620. For example, the user may be prompted to verify or describe an extent of such damage. Additionally or alternatively, the user may determine whether and when to add an annotation. The GUI may be configured to receive an annotation associated with a location within the virtual representation from the user, in order to indicate a condition of a component of the physical structure. The user electronic device 680 may communicate the annotation or an indication thereof to the server 620 via the communication network 616. The server 620 may receive an indication of the annotation, which may include information regarding the location of the annotation within the virtual representation (e.g., a component or a location within the virtual 3D digital model). The server 620 may store the received indication of the annotation in memory associated with the server. In addition, the server 620 may utilize the indication of the annotation in generating a claim report associated with the structure.

At block 1916, the server 620 or the user electronic device 680 may generate a claim report item based upon the virtual 3D digital model of the physical structure, which may include information regarding one or more identified damaged components and one or more user annotations. One or more claim report items associated with one or more components of the physical structure may be generated. These claim report items may be generated based upon identified damage to components of the structure or based upon one or more user annotations, which may include locations within the virtual representation associated with such annotations. A claim report containing one or more claim report items may be compiled, stored, or presented to a reviewer via a display associated with a reviewer computing device for review and verification. Upon review and verification, the claim report may be processed to expedite payment of insurance claims associated with the physical structure. In some embodiments, the user may be the reviewer, and the claim report may be presented via the GUI of the user electronic device 680. If the reviewer is separate from the user, in some embodiments, the visual representations of the physical structure may be synchronized between the displays of the user and the reviewer. Thus, any manipulation of the virtual representation by either the user or the reviewer may automatically synchronize any additional visual representation between both the user computing device and the reviewer computing device. This allows the user and the reviewer to view the same perspective at the same time, further allowing them to quickly and easily discuss damage to the structure at different locations. For example, the user and reviewer may discuss likely damage telephonically while viewing coordinated visual representations of the structure.

Generally, it is described herein how images are captured by an imaging vehicle of a structure and/or location. After capturing the images, the imaging vehicle may transmit the captured images to a remote server via a communication network. Using virtual 3D digital modeling software, the server may construct a virtual 3D digital model of the structure and/or location from all the images that the imaging vehicle has captured. This virtual 3D digital model may be accessed by remote users using virtualization software applications, and the virtual 3D digital model may be used to generate and view representations of the virtual 3D digital models of the structure. The representations of the virtual 3D digital models of the structure may be generated from the virtual 3D digital model by the virtual imaging software of the server. Users may be able to remotely access these representations of the virtual 3D digital models, which may be stored in a storage unit or data base that is associated with the server. The user can manipulate the representations of the virtual 3D digital models to view them from various perspectives, and to compare the before-the-damage images with images taken after damage has occurred. Thus the user is enabled to remotely communicate with an insurer and/or file an insurance claim.

Other Damage or Loss Assessment

Although the preceding discussion primarily discusses damage assessment using Virtual Reality, Augmented Reality (AR), and/or or mixed reality by generating models representing sites, areas, structures, or portions thereof, other uses of the methods and systems described are envisioned. The methods and systems described above apply equally to other uses with appropriate modifications, primarily modifications to the types of virtual objects and data sources used to estimate costs associated with the damage. In further embodiments, other types of physical infrastructure may be similarly assessed, such as bridges, dams, embankments, walls, levies, parking lots, parking garages, docks, ramps, roads, or other infrastructure. Corresponding virtual objects may be indicative of concrete, brick, compact earth, steel, or other reinforcements, walls, columns, roofs, or beams.

In yet further embodiments, the methods and systems described above may be applied to vehicles, such as cars, trucks, boats, motorcycles, airplanes, or trains. For example, the virtual objects may correspond to components of a vehicle, such as a windshield, a bumper, a hood, a door, a side view mirror, a wheel, a light housing, a trunk, a roof panel, or a side panel. The user may select, position, and resize the virtual objects to match damaged components of the vehicle. In some embodiments, the virtual objects may be generic virtual objects representing general components found in many vehicles. In other embodiments, the virtual objects may be selected for a specific make and model of vehicle, in order to better fit the design of the damaged vehicle. In either case, the user may select, place, position, and/or adjust the virtual objects within a virtual space representing a physical environment containing the vehicle. Pointer objects may also be added to indicate further conditions, such as broken axels or water damage. From such virtual objects or pointer objects indicated by the user, the mobile computing device may determine the extent of damage and may generate a report, as discussed above.

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer system comprising:
   one or more processors; and
   a non-transitory program memory communicatively coupled to the one or more processors and storing executable instructions that, when executed by the one or more processors, cause the computer system to:
   receive, from a first computing device associated with an aerial vehicle, a plurality of images illustrating an insured object;
   generate a virtual 3D model of the insured object based at least in part on the plurality of images;
   provide, to a second computing device, the virtual 3D model;
   receive, from the second computing device, an annotation associated with a damaged feature of the insured object, wherein
   the damaged feature is rendered at a location within the virtual 3D model, and
   the annotation includes information describing an extent of damage to the feature;
   determine, based at least in part on the information, an amount of monetary loss corresponding to the extent of damage to the feature;
   generate, based at least in part on the annotation, an insurance claim report including:
   the extent of damage, the amount of monetary loss, and an indication of the location of the damaged feature within the virtual 3D model;
   provide, to the second computing device, the insurance claim report;
   receive an indication of approval of the insurance claim report; and
   provide, based at least in part on the indication of approval and the amount of monetary loss, an insurance claim payment associated with the damaged feature.

2. The computing system of claim 1, wherein the instructions cause the computing system to:
   provide to a third computing device associated with a claim reviewer, the virtual 3D model and the insurance claim report; and
   receive, from the third computing device, the indication of approval of the insurance claim report.

3. The computing system of claim 1, wherein the instructions further cause the computing system to:
   provide to a third computing device associated with claim reviewer, the virtual 3D model and the insurance claim report;
   receive, from the third computing device, second information indicative of a manipulation of the virtual 3D model; and
   based at least in part on the second information, cause a first representation of the virtual 3D model generated by the second computing device to match a second representation of the virtual 3D model generated by the third computing device,
   wherein causing the first representation to match the second representation provides a presentation of a same perspective of the virtual 3D model on the second computing device and the third computing device at a same time.

4. The computing system of claim 1, wherein the virtual 3D model is a first virtual 3D model generated at a first time, the instructions further causing the computing system to:
   access a database associated with the computing system to identify a second virtual 3D model of the object, the second virtual 3D model being generated at a second time prior to the first time; and
   determine a difference between the first virtual 3D model and the second virtual 3D model; and
   identify damage to the feature represented in the first virtual 3D model based at least in part on the difference,
   wherein the first virtual 3D model provided to the second computing device includes an indication of the damage.

5. The computing system of claim 4, wherein the instructions further cause the computing system to:
   provide, to the second computing device, the first virtual 3D model and the second virtual 3D model; and
   provide, to the second computing device, instructions to render a visualization illustrating:
   the feature as represented in the first virtual 3D model, and
   the feature as represented in the second virtual 3D model.

6. The computing system of claim 1, wherein the instructions further cause the computing system to:
 identify a set of data points associated with the virtual 3D model;
 determine that at least one data point of the set of data points does not match an expected criterion associated with the object, the at least one data point being associated with the feature; and
 identify damage to the object based at least in part on determining that the at least one data point does not match an expected criterion,
  wherein the virtual 3D model includes an indication of the damage.

7. A computer-implemented method comprising:
 receiving, from a first computing device, a plurality of images illustrating an insured object;
 generating a virtual 3D model of the insured object based at least in part on the plurality of images;
 providing, to a second computing device, the virtual 3D model;
 receiving, from the second computing device, an annotation associated with a damaged feature of the insured object, wherein
  the damaged feature is rendered at a location within the virtual 3D model, and
  the annotation includes information describing an extent of damage to the feature;
 determining, based at least in part on the information, an amount of monetary loss corresponding to the extent of damage to the feature;
 generating, based at least in part on the annotation, an insurance claim report including: the extent of damage, the amount of monetary loss, and an indication of the location of the feature within the virtual 3D model;
 providing, to the second computing device, the insurance claim report;
 receiving an indication of approval of the insurance claim report; and
 providing, based at least in part on the indication of approval and the amount of monetary loss, an insurance claim payment associated with the damaged feature.

8. The computer-implemented method of claim 7, wherein the method comprises:
 providing to a third computing device associated with a claim reviewer, the virtual 3D model and the insurance claim report; and
 receiving, from the third computing device, the indication of approval of the insurance claim report.

9. The computer-implemented method of claim 7, further comprising:
 providing to a third computing device associated with a claim reviewer, the virtual 3D model and the insurance claim report;
 receiving, from the third computing device, second information indicative of a manipulation of the virtual 3D model; and
 based at least in part on the second information, causing a first representation of the virtual 3D model generated by the second computing device to match a second representation of the virtual 3D model generated by the third computing device,
  wherein matching the first representation and the second representation provides a presentation of a same perspective of the virtual 3D model on the second computing device and the third computing device at a same time.

10. The computer-implemented method of claim 9, wherein the manipulation of the
 virtual 3D model comprises at least one of:
 a selection of a portion of the virtual 3D model;
 a rotation of the virtual 3D model;
 a zoom associated with the virtual 3D model; or
 a change to an angular view of the virtual 3D model.

11. The computer-implemented method of claim 7, wherein the virtual 3D model is a first virtual 3D model generated at a first time, the method further comprising:
 accessing a database to identify a second virtual 3D model of the object, the second virtual 3D model being generated a second time prior to the first time;
 determining a difference between the first virtual 3D model and the second virtual 3D model; and
 identify damage to the object represented in the first virtual 3D model,
  wherein the first virtual 3D model provided to the second computing device includes an indication of the damage.

12. The computer-implemented method of claim 7, further comprising:
 identifying a set of data points associated with the virtual 3D model;
 determining that at least one data point of the set of data points does not match an expected criterion associated with the object; and
 identify damage to the object based at least in part on determining that the at least one data point does not match an expected criterion,
  wherein the virtual 3D model includes an indication of the damage.

13. The computer-implemented method of claim 7, wherein the plurality of images are captured by at least one camera associated with at least one aerial vehicle, the camera being configured to capture images in at least one of:
 a visible spectrum; or
 an infrared spectrum.

14. The computer-implemented method of claim 7, wherein the plurality of images are associated with a first time period, further comprising:
 receiving, at a second time period prior to the first time period, a request to assess the object for damage; and
 sending, to the first computing device, an instruction to capture the plurality of images,
  wherein the plurality of images are received based at least in part on the instruction to capture the plurality of images.

15. One or more non-transitory computer-readable media storing executable instructions that, when executed by at least one processor of a computer system, cause the computer system to:
 receive, from a first computing device associated with a sensor, a plurality of images illustrating an insured object;
 generate a virtual 3D model of the insured object based at least in part on the plurality of images;
 provide, to a second computing device, the virtual 3D model;
 receive, from the second computing device, an annotation associated with a damaged feature of the insured object, wherein:
  the damaged feature is rendered at a location within the virtual 3D model, and
  the annotation includes information describing an extent of damage to the feature;

determine, based at least in part on the information, an amount of monetary loss corresponding to the extent of damage to the feature;

generate, based at least in part on the annotation, an insurance claim report including: the extent of damage, the amount of monetary loss, and an indication of the location of the feature within the virtual 3D model;

provide, to the second computing device, the insurance claim report;

receive an indication of approval of the insurance claim report; and provide, based at least in part on the indication of approval and the amount of monetary loss, an insurance claim payment associated with the damaged feature.

16. The one or more non-transitory computer-readable media of claim 15, wherein the instructions cause the computer system to:

provide to a third computing device associated with a claim reviewer, the virtual 3D model and the insurance claim report; and receive, from the third computing device, the indication of approval of the insurance claim report.

17. The one or more non-transitory computer-readable media of claim 15, wherein the instructions further cause the computer system to:

provide to a third computing device associated with a claim reviewer, the virtual 3D model and the insurance claim report;

receive, from the third computing device, second information indicative of a manipulation of the virtual 3D model; and based at least in part on the second information, cause a first representation of the virtual 3D model generated by the second computing device to match a second representation of the virtual 3D model generated by the third computing device, wherein causing the first representation to match the second representation provides a presentation of a same perspective of the virtual 3D model on the second computing device and the third computing device at a same time.

18. The one or more non-transitory computer-readable media of claim 15, wherein the virtual 3D model is a first virtual 3D model generated at a first time and wherein the instructions further cause the computer system to:

identify damage to the feature of the object based at least in part on at least one of:

a difference between the first virtual 3D model and a second virtual 3D model of the object generated at a second time prior to the first time; or a determination that at least one data point of a set of datapoints associated with the first virtual 3D model does not match an expected criterion associated with the object, wherein the first virtual 3D model provided to the second computing device includes an indication of the damage.

19. The one or more non-transitory computer-readable media of claim 18, wherein the instructions further cause the computer system to:

provide, to the second computing device, instructions to render a prompt requesting information describing the extent of damage to the feature, wherein the annotation is received in response to the prompt.

20. The one or more non-transitory computer-readable media of claim 15, wherein the virtual 3D model is generated at a first time and wherein the instructions further cause the computer system to:

receive, at a second time prior to the first time, a request to assess the object for damage; and send, to the first computing device, an instruction to capture the plurality of images, wherein the plurality of images are received based at least in part on the instruction.

* * * * *